(12) United States Patent
Felstaine et al.

(10) Patent No.: US 12,505,176 B1
(45) Date of Patent: Dec. 23, 2025

(54) SYSTEM, METHOD, AND COMPUTER PROGRAM FOR ORCHESTRATING TIME-LIMITED AI-INFERENCING

(71) Applicant: Amdocs Development Limited, Limassol (CY)

(72) Inventors: Eyal Felstaine, Herzliya (IL); Gad Yitzhak Weissman, Hod Hasharon (IL); Marina Ankri, Karnei Shomron (IL); Nimrod Sandlerman, Ramat Gan (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 969 days.

(21) Appl. No.: 17/125,780

(22) Filed: Dec. 17, 2020

Related U.S. Application Data

(63) Continuation of application No. 17/122,968, filed on Dec. 15, 2020.

(51) Int. Cl.
*G06F 18/20* (2023.01)
*G06F 18/21* (2023.01)
*G06F 18/2431* (2023.01)
*G06N 20/00* (2019.01)

(52) U.S. Cl.
CPC ........ *G06F 18/285* (2023.01); *G06F 18/2163* (2023.01); *G06F 18/2431* (2023.01); *G06N 20/00* (2019.01)

(58) Field of Classification Search
CPC .............. G06F 18/285; G06F 18/2163; G06F 18/2431; G06N 20/00

USPC ......................................................... 706/12
See application file for complete search history.

(56) References Cited

U.S. PATENT DOCUMENTS

| | | | |
|---|---|---|---|
| 11,221,885 B1* | 1/2022 | Ross | G06F 9/505 |
| 2005/0114382 A1 | 5/2005 | Lakshminarayan et al. | |
| 2005/0149940 A1 | 7/2005 | Calinescu et al. | |
| 2009/0234878 A1* | 9/2009 | Herz | H04N 7/1675 |
| | | | 707/999.102 |
| 2012/0272041 A1 | 10/2012 | Vance et al. | |
| 2014/0280193 A1* | 9/2014 | Cronin | G06F 16/2455 |
| | | | 707/741 |
| 2015/0268990 A1 | 9/2015 | Greene et al. | |
| 2015/0379426 A1 | 12/2015 | Steele et al. | |
| 2017/0220949 A1 | 8/2017 | Feng et al. | |
| 2019/0236485 A1* | 8/2019 | Stanley, III | H04L 67/303 |
| 2020/0219015 A1 | 7/2020 | Lee et al. | |
| 2022/0076081 A1* | 3/2022 | Jeong | G06F 18/217 |

(Continued)

OTHER PUBLICATIONS

Felstaine et al., U.S. Appl. No. 17/122,968, filed Dec. 15, 2020.

(Continued)

*Primary Examiner* — Stephen S Hong
*Assistant Examiner* — Broderick C Anderson
(74) *Attorney, Agent, or Firm* — Zilka-Kotab, P.C.

(57) ABSTRACT

As described herein, a system, method, and computer program are provided for processing a dataset. In one embodiment, an AI-model to inference the dataset is selected. A plurality of inferencing engines each using the AI-model are initiated, where a number of the inferencing engines that are initiated is calculated according to a predetermined time constraint. The dataset is divided between the plurality of inferencing engines.

9 Claims, 16 Drawing Sheets

(56) References Cited

U.S. PATENT DOCUMENTS

2022/0076144 A1* 3/2022 Ram .................. G06N 5/04

OTHER PUBLICATIONS

Felstaine et al., U.S. Appl. No. 17/125,689, filed Dec. 17, 2020.
Non-Final Office Action from U.S. Appl. No. 17/125,689, dated Dec. 21, 2023.
Final Office Action from U.S. Appl. No. 17/125,689, dated Jul. 11, 2024.
Non-Final Office Action from U.S. Appl. No. 17/122,968, dated Dec. 20, 2023.
Final Office Action from U.S. Appl. No. 17/122,968, dated Jul. 11, 2024.
Advisory Action from U.S. Appl. No. 17/122,968, dated Oct. 16, 2024.
Advisory Action from U.S. Appl. No. 17/125,689, dated Oct. 15, 2024.
Non-Final Office Action from U.S. Appl. No. 17/122,968, dated Dec. 12, 2024.
Non-Final Office Action from U.S. Appl. No. 17/125,689, dated Dec. 20, 2024.

* cited by examiner

SYSTEM, METHOD, AND COMPUTER PROGRAM FOR ORCHESTRATING TIME-LIMITED AI-INFERENCING

FIELD OF THE INVENTION

The present invention relates to the field of artificial intelligence (AI), and, more particularly, but not exclusively, to the use of a combination of a plurality of different AI-models in a time-limited and/or cost limited processing environment, and, more particularly, but not exclusively, to orchestrating the flow of information between a plurality of different AI-models to achieve a useful result under time-limiting and/or cost limited constraints.

BACKGROUND

A large-scale service provider such as company operating a communication network provides various services to a very large number of customers. Such operators repeatedly analyze their respective customer databases, as well as their respective service offering, to improve their offering to the various customers. The main purpose of the analysis is to increase the operators' competitiveness in the market. Changing the service offering may change the customer-base, and vice versa. Changing the service offering and the customer-base may change the networking hardware and software requirements. Changes to the network hardware and software may change the availability and costing of services to the customer-base. Altogether, evolving into an ever-changing business environment involving a very large number of combinations, permutations, and arrangements, requiring continuous analysis and optimization.

Much of the analysis is done using artificial intelligence (AI) to characterize and classify the customers, service offerings, monetizing options, service plans, business packages, etc., to increase customer satisfaction. While this discussion concentrates on the business level of operating a communication network and services, it is appreciated that the arguments herein hold to any type of database, or dataset, or AI technology.

It is appreciated that the effectiveness, or efficiency, of accuracy, of an AI-model may drift, or decay, with time, for various reasons. One type of reasons for drifting is a change of the content of the dataset used to train the particular AI-model. For example, a change of the customer-base, or service offering, or monetizing arrangement, and thus changing the billing structure, the costing structure, the network structure, etc.

Another type of reasons for model drifting is that if the AI-model is used to recognize (i.e., detect) and eliminate a situation, the situation may consequently disappear from the inferenced input rendering the particular AI-model ineffective.

Both types of reasons, as well as other, similar types of reasons for AI-model drifting, require, on one hand, continuous training of various AI-models to process various different situations of the same problem. And, on the other hand, the use a plurality of various AI-models to process the different situations of the same problem. Such processing takes time and incur cost. Such time considerations and cost considerations may have opposing effects, for example, reducing processing time may increase the cost of processing and vice versa, thus rendering optimization considerations.

There is thus a need for addressing the need to orchestrate the use of a plurality of AI-models to process a situation under one or more time-limiting constraints and or one or more cost limiting constraints.

SUMMARY

As described herein, a system, method, and computer program are provided for processing a dataset. In one embodiment, an AI-model to inference the dataset is selected. A plurality of inferencing engines each using the AI-model are initiated, where a number of the inferencing engines that are initiated is calculated according to a predetermined time constraint. The dataset is divided between the plurality of inferencing engines.

In another embodiment, a first AI-model is trained to cluster a first dataset into a first classification. Instances of the first dataset are labeled according to the first classification to create a labeled dataset. The first classification is divided into a plurality of sets of classes. The labeled dataset is divided according to the plurality of sets of classes to form a plurality of labeled datasets, wherein each dataset of the plurality of labeled datasets includes only labeled instances of the respective class. A plurality of AI-models are trained, each with a different labeled dataset. A dataset is fed to a plurality of inferencing engines, each using an AI-model of the plurality of second AI-models to shorten the time of processing of the dataset to fit within a predetermined time constraint, or a plurality of inferencing engines are arranged, wherein each of the inferencing engines is using an AI-model of the plurality of second AI-models, so that instances of the dataset that are not properly recognized by a former inferencing engine are fed to the input of a later inferencing engine, to reduce cost of processing of the dataset to fit within a predetermined cost constraint.

In yet another embodiment, a first AI-model is trained to cluster a first dataset into a first classification. Instances of the first dataset are labeled according to the first classification to create a labeled dataset. The first classification is divided into a plurality of sets of classes. The labeled dataset is divided according to the plurality of sets of classes to form a plurality of labeled datasets, wherein each dataset of the plurality of labeled datasets includes only labeled instances of the respective class. A plurality of AI-models is trained, each with a different labeled dataset. An AI-model is selected to recognize instances of a second dataset according to at least one of: the number of instances in the second dataset, a monetary value of the selected classes, a cost of processing of the selected classes, a time of processing of the selected classes, or a predetermined time requirement, and a predetermined cost requirement.

DETAILED DESCRIPTION

Figure 1A:
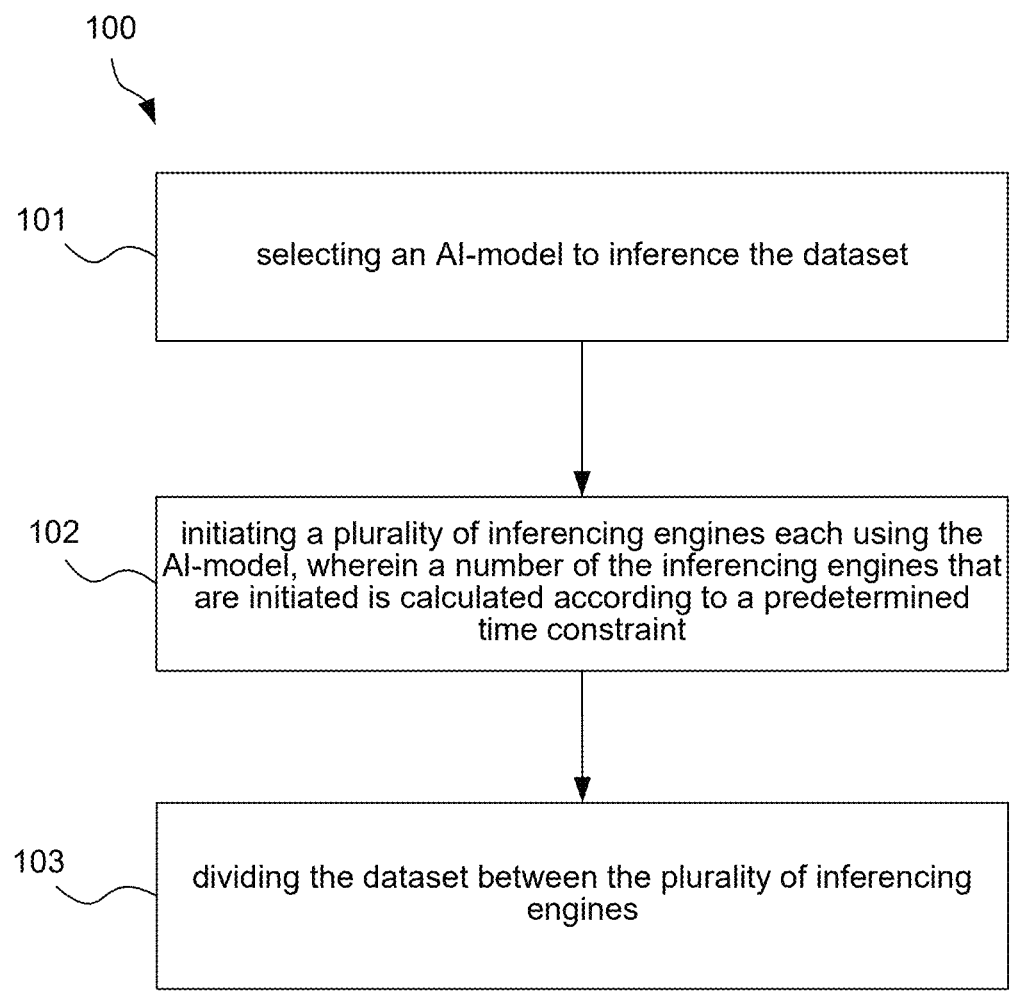
FIGS. 1A-C illustrate methods for processing a dataset, in accordance with various embodiments.

FIG. 1A illustrates a method 100 for processing a dataset, in accordance with an embodiment. The method 100 relates to a process for dividing a dataset between a plurality of inferencing engines using the same AI-model to shorten the time of processing, inferencing, classification, etc. of the dataset to fit within a predetermined time constraint or requirement.

In operation 101, an AI-model to inference the dataset is selected. In operation 102, a plurality of inferencing engines each using the AI-model are initiated. A number of the inferencing engines that are initiated is calculated according to a predetermined time constraint. In operation 103, the dataset is divided between the plurality of inferencing engines.

In one embodiment, the method 100 is performed by an orchestration system in communication with the plurality of inferencing engines. In another embodiment, the number of the inferencing engines that are initiated is further calculated based on a stored value representing a previously measured time for executing the AI-model to recognize one or more instances from an input dataset. In another embodiment, the dataset and the predetermined time constraint are received as input.

In yet another embodiment, each inferencing engine of the plurality of inferencing engines are caused to execute a respective instance of the AI-model on a respective received portion of the dataset. Further to this embodiment, as an option, a result of executing the respective instance of the AI-model on the respective received portion of the dataset is received from each inference engine of the plurality of inferencing engines. As an additional option, the result may include recognized instances included in the respective received portion of the dataset and unrecognized instances included in the respective received portion of the dataset.

Figure 1B:
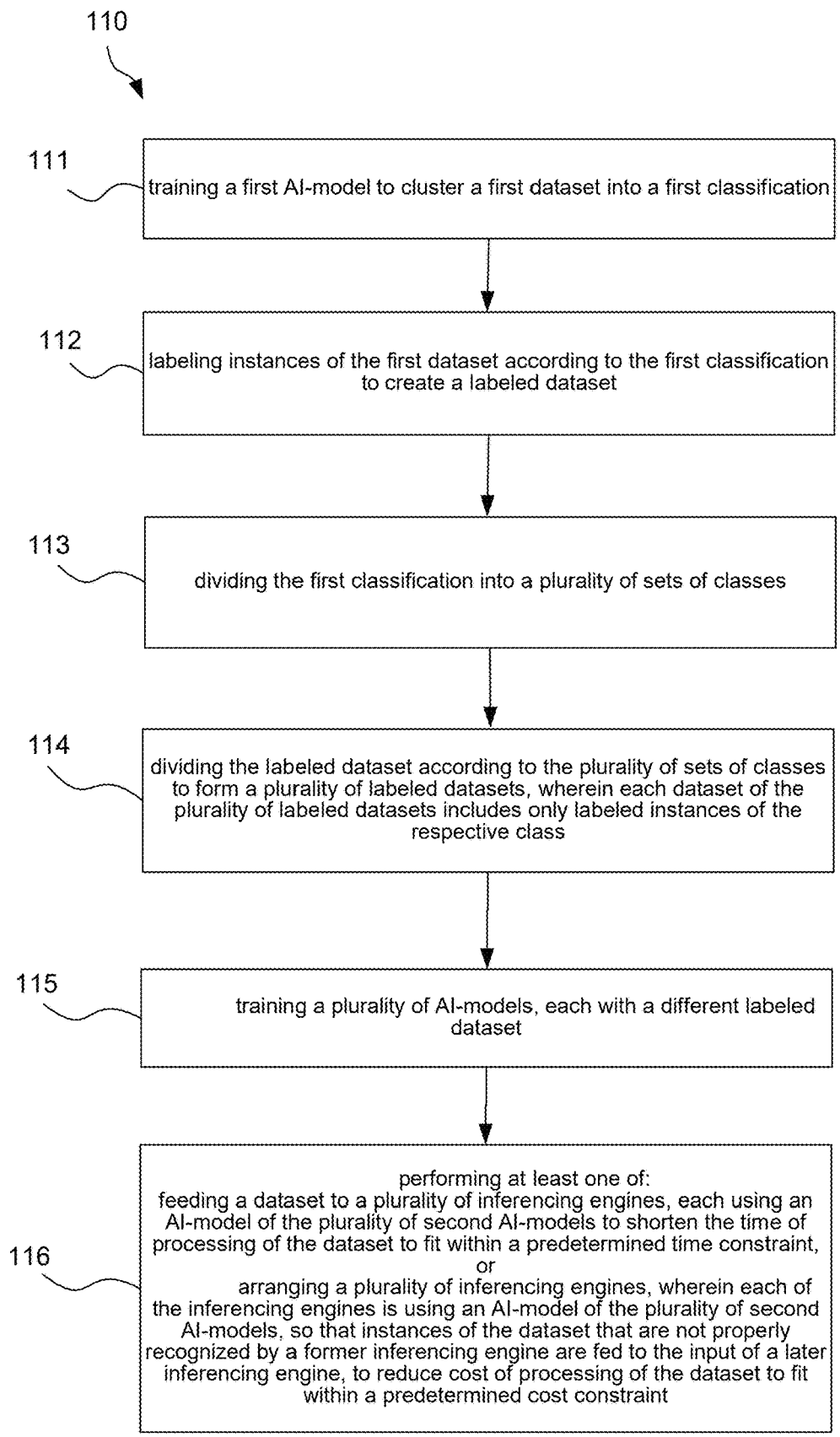

FIG. 1B illustrates a method 110 for processing a dataset, in accordance with an embodiment. The method 110 relates to a process for dividing a first classification of a first AI-model between a plurality of second AI-models, so that the combined classification of the plurality of second AI-models is the first classification, and then feeding a dataset to a plurality of inferencing engines, each using an AI-model of the plurality of second AI-models to shorten the time of processing, inferencing, classification, etc. of the dataset to fit within a predetermined time constraint or requirement, or arranging a plurality of inferencing engines, wherein each of the inferencing engines is using an AI-model of the plurality of second AI-models, so that instances of the dataset that are not properly recognized by a former inferencing engine are fed to the input of a later inferencing engine, to reduce cost of processing, inferencing, classification, etc. of the dataset to fit within a predetermined cost constraint or requirement.

In operation 111, a first AI-model is trained to cluster a first dataset into a first classification. In operation 112, instances of the first dataset are labeled according to the first classification to create a labeled dataset. In operation 113, the first classification is divided into a plurality of sets of classes. In operation 114, the labeled dataset is divided according to the plurality of sets of classes to form a plurality of labeled datasets, wherein each dataset of the plurality of labeled datasets includes only labeled instances of the respective class. In operation 115, a plurality of AI-models are trained, each with a different labeled dataset. In operation 116, a dataset is fed to a plurality of inferencing engines, each using an AI-model of the plurality of second AI-models to shorten the time of processing of the dataset to fit within a predetermined time constraint, or a plurality of inferencing engines are arranged, wherein each of the inferencing engines is using an AI-model of the plurality of second AI-models, so that instances of the dataset that are not properly recognized by a former inferencing engine are fed to the input of a later inferencing engine, to reduce cost of processing of the dataset to fit within a predetermined cost constraint.

In one embodiment, the method 110 is performed by an orchestration system in communication with the plurality of inferencing engines. In another embodiment, at least one of the predetermined time constraint or the predetermined cost constraint is received as input. Th predetermined time constraint may limit a time of processing of the dataset. The predetermined cost constraint may limit a cost of processing of the dataset.

In yet another embodiment, feeding the dataset to the plurality of inferencing engines causes each inferencing engine of the plurality of inferencing engines to execute a respective AI-model on the dataset, and arranging the plurality of inferencing engines includes causing an initial inferencing engine of the inferencing engines to execute a respective AI-model on the dataset. Further to this embodiment, as an option, results are received from the inference engines.

Figure 1C:
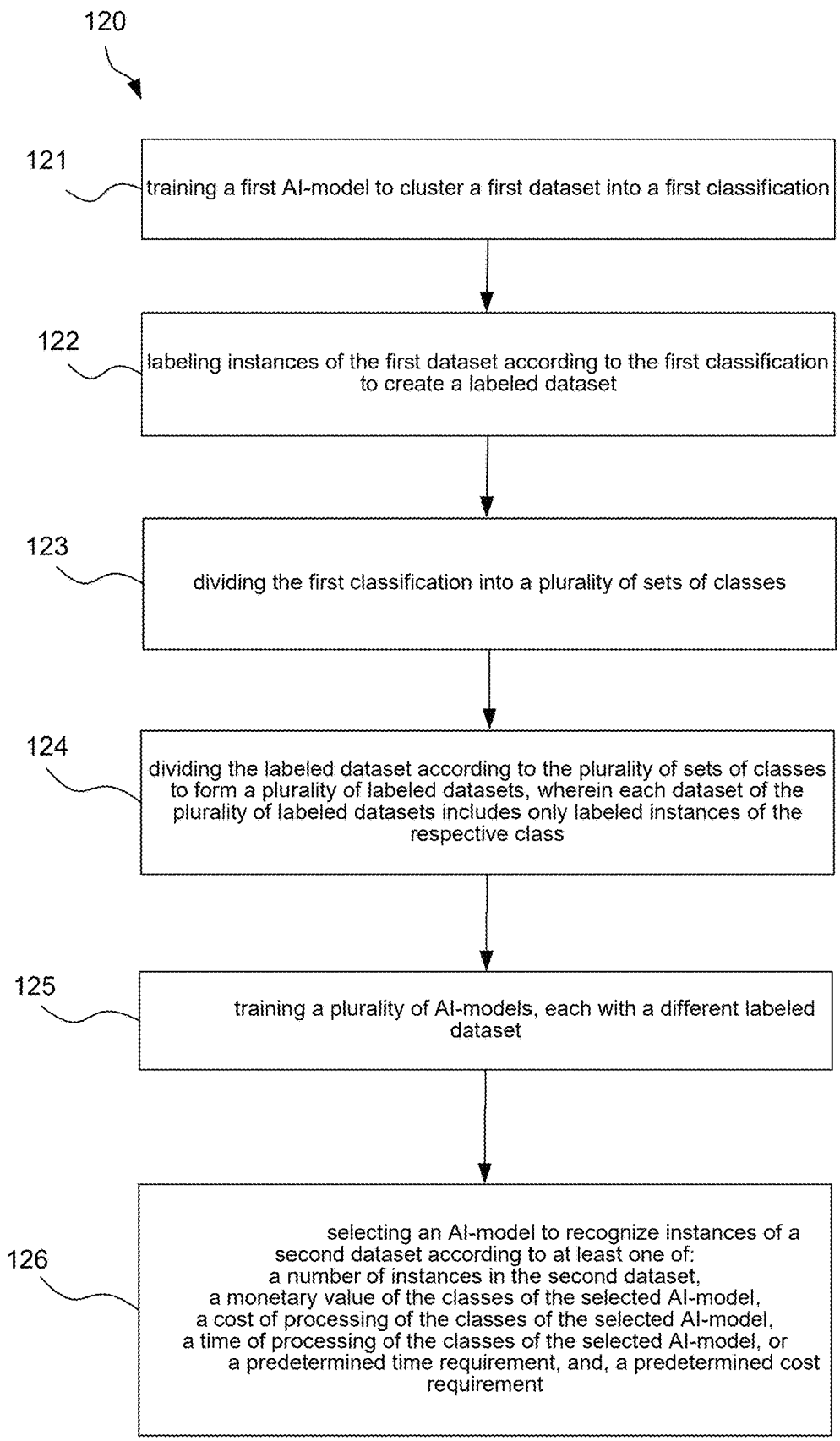

FIG. 1C illustrates a method 120 for processing a dataset, in accordance with an embodiment. The method 120 relates to a process for using an AI system to cluster a first dataset into a first classification comprising a first plurality of classes of instances of the first dataset; selecting a second classification comprising a second plurality of classes selected from the first classification; training a plurality of AI-models, wherein each AI-model is trained with a different second classification; and selecting an AI-model to recognize instances of a second dataset according to at least one of: the number of instances in the second dataset, a monetary value of the selected classes, a cost of processing of the selected classes, a time of processing of the selected classes, a predetermined time requirement, or a predetermined cost requirement.

In operation 121, a first AI-model is trained to cluster a first dataset into a first classification. In operation 122, instances of the first dataset are labeled according to the first classification to create a labeled dataset. In operation 123, the first classification is divided into a plurality of sets of classes. In operation 124, the labeled dataset is divided according to the plurality of sets of classes to form a plurality of labeled datasets, wherein each dataset of the plurality of labeled datasets includes only labeled instances of the respective class. In operation 125, a plurality of AI-models is trained, each with a different labeled dataset. In operation 126, an AI-model is selected to recognize instances of a second dataset according to at least one of: the number of instances in the second dataset, a monetary value of the selected classes, a cost of processing of the selected classes, a time of processing of the selected classes, or a predetermined time requirement, and a predetermined cost requirement.

In one embodiment, the method 120 is performed by an orchestration system in communication with a plurality of inferencing engines having the AI-models. In another embodiment, at least one of the following is received as input: the number of instances in the second dataset, the monetary value of the classes of the selected AI-model, the cost of processing of the classes of the selected AI-model, the time of processing of the classes of the selected AI-model, or the predetermined time requirement, and the predetermined cost requirement.

In one embodiment, the AI-model is selected for being trained with a set of classes having a larger number of classes to increase a number of instances of the second dataset being recognized. In another embodiment, the AI-model is selected for being trained with a set of classes having a smaller number of classes to reduce at least one of the time of processing, or the cost of processing.

In one embodiment, selecting the AI-model to recognize instances of a second dataset includes: selecting a set of classes, selecting an AI-model trained with the selected set of classes, and providing at least one instance of the second dataset to the selected AI-model to be classified according to the selected set of classes. Further to this embodiment, as an option, a result from execution of the AI-model is received.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In one embodiment, the purpose of the system and method may be to improve the use of artificial intelligence (AI) analyzing a complex situation by a plurality of AI-models under a time-limiting constraint and/or cost limiting constraints.

Particularly, in one embodiment, the system and method may have more than one order of operating a plurality of AI-models to analyze the situation, and the system and method may select a particular order to achieve an optimization goal, for example, considering time and/or cost requirements.

Particularly, in one embodiment, the system and method may have alternative AI-models for analyzing the situation and the system and method may select a particular set of AI-models to achieve an optimization goal, for example, considering time and/or cost requirements.

The term 'operator' may refer to an operator of a communication network (also known as 'carrier').

The term 'communication network' or 'network' may refer to any type of electronic network for communicating data between any type of data servers, network servers, network nodes, and any type of terminal equipment. The term 'communication network' or 'network' may refer to networks such as wired telephony service (POTS, PSTN), wireless (mobile, cellular) telephony service (PLMN), satellite communication service (e.g., SATCOM), multi-channel television service via cable, satellite, wireless terrestrial transmission, and/or Internet, multichannel video programming distributor (MVPD), virtual MVPD (vMVPD), Internet service (e.g., via an Internet service provider—ISP or via an wireless Internet service provider—WISP), etc. The term 'communication network' or 'network' may refer to any combination of the above.

The term 'service' may refer to any type of communication service provided to a customer, such as a customer of an operator of a communication network, as well as access to content including transmission, reception, and exchange of content. The term 'content' may refer to any type of text, image, video, three-dimensional (3D) imaging, games (e.g., computer games and/or video games), virtual reality content, augmented reality content, etc.

The term 'content' may refer to any type of text, image, video, three-dimensional (3D) imaging, games (e.g., computer games and/or video games), virtual reality content, augmented reality content, etc.

An operator may provide services to a plurality of customers, where each customer may use a particular plurality (e.g., combination, configuration) of services. The customer and each of the service can be monetized in a plurality of monetization schemes, or a combination of monetization schemes. Each service may be associated with a cost, or a combination of costs, where a particular type of cost may also depend on the usage, as well as temporal distribution of usage, of other services. Additionally, a particular type of cost may also depend on the usage, as well as temporal distribution of usage, of other customers. Therefore, for each particular customer there may be a plurality of different business arrangement (configurations) that may have different respective business results.

The term 'monetizing' may refer to any type of billing or charging or applying revenues (as well as costs, expenditures, etc.) to any particular customer. For example, monetizing may refer to billing periodical (e.g., monthly, annual, etc.), billing by item consumed (e.g., a content item), billing by service consumed (e.g., bandwidth), etc.

The term 'monetizing' may also refer to any type of revenues received from a third party on behalf of the customer. For example, applying revenues from a third party's advertisement to the customer exposed to the advertisement. For example, applying marketing expenditure, such as advertisement and/or promotion by the operator to a customer. For example, applying monetary value for making use of the customer's social activity for promoting the operator or any type of operator's service.

Monetizing may take the form of actual revenues, or cost saving, or credit points. Such credit points may be issued, or charged to, the operator or any third party using a service of the operator.

The term 'bill' or 'billing' may refer to the act of issuing a document to the customer, the document indicating a charge to the customer for the services rendered to the customer by the operator in a previous period of time. The bill may include any number of billing items, each associated with the customer and at least one of the services rendered to the customer, as well as the monetization scheme applied to the particular customer (also known as 'plan', or 'bundle', or 'package', etc.).

The term 'temporal use', particularly with reference to monetizing, may refer to pricing a service according to time-of-day, day-of week, load type and/or load period, etc. The availability of services, particularly service provided by thirds parties, may frequently change. The pricing of any such service may also change, depending on general consumption, local consumption, competition, etc. Therefore, the plurality of business arrangements, as well as their business results to the operator, may change continuously and fast.

The term 'cost' or 'costing' may refer to any type of expenditure incurred by the operator and directly or indirectly associated with a service rendered to a customer. A service provider may provide to each particular customer a plurality of possible services. Each such service may be associated with a direct cost, where the cost of each service may depend on other services provided to the particular customer, as well as one or more services provided to other customers associated with the particular customer. Such association of costs, or cost sharing, may be determined according to the network topology and/or configuration.

Particularly, the term 'cost' may apply to the cost of operating a call-center. Particularly, the term 'cost' may apply to the cost of operating a call-center to deal with a customer call, such as to resolve a problem raised by the customer, particularly a problem associated with a particular billing item.

Further, the term 'cost' may also refer to the cost of customer churn, cost of customer switching, cost of customer retention, etc. Cost associated with a particular customer may also be determined in terms of customer lifetime value, gained, increased, or lost. Hence, an optional resolution to a particular potential call incident associated with a particular billing items may be considered in terms associated with the particular customer. Still further, the term 'cost' may also refer to any type of revenue that may be generated, as well as lost potential revenues associated, such as revenues associated with services that may be offered to a customer.

The term 'cost limit', and/or 'cost constraint' may refer to a limit on the cost, and particularly to a limit on the cost of providing a solution, and particularly to a limit on the cost of processing an input and providing a respective output so that the output is useful within a changing environment. It is appreciated that the value of any cost limit and/or cost constraint may change over time. A complex AI processing system may therefore have any number of cost limits and/or cost constraints, some of which may be changing independently of each other.

The terms 'continuously' and 'automatically' may refer to the computing system operating the communication network, or a part thereof, that may, from time to time, determine automatically when to apply to a customer, and what to suggest to the customer, based on a large plurality of 'rules' and at least one parameter provided by the operator (e.g., operator's personnel).

The terms 'artificial intelligence or 'AI' may refer to any type and use of an software program, which may be called 'AI engine', to process a large amount of content or data, which may be called 'a dataset', to produce an 'AI-model', which may be termed here, a 'training action'. In a further action, which may be termed here, an 'inferencing action' tan AI engine using the AI-model may identify, and/or detect, and/or determine, and/or recognize, a particular type of content item, or data item, of the dataset, or a similar dataset.

Typically the AI engine may produce an AI model that can identify a large number of content item types, or data item types. The term 'AI-model' may also be known as a 'predictor'. A 'training AI engine' may use a first dataset to train a particular algorithm to produce a respective AI-model. An 'inference AI engine' may use the AI-model to analyze a second dataset to detect particular data types, or to predict particular situations, etc.

The terms 'artificial intelligence or 'AI' may refer to any type of AI such as machine learning (ML), deep learning (DL), big-data analysis, etc.

The term 'outlier', and/or 'outlier value', and/or 'hidden characteristic', and/or 'subliminal classification', and/or 'missing label', may all refer to a type or class of data records, or a data value, or a range of data values, of such type or class of data records, or a possible label associated with such type or class of data records, and/or data record value, of a dataset. The terms 'subliminal classification', and/or 'hidden characteristic', and/or 'missing label' and/or 'outlier value' may be used interchangeably.

Particularly, the term 'outlier' (or any of the other terms disclosed above) may refer to any one or more characteristics of a first dataset, that an AI-model developed for the first dataset, or trained using the first dataset, does not recognize, but a second AI-model developed for the second dataset, or trained using the second dataset, may recognize.

The term 'confederated AI' (and/or 'confederated artificial intelligence' and/or 'confederated AI-models' may refer to any method or system that may use a first AI-model created for a first dataset, to reveal at least one 'outlier' of a second dataset.

The term 'dataset' may refer to any collection of data, or data records, such as a data-store, or a database. Embodiments herein may refer to a dataset, or a database, of customers of an operator of a communication network. However, it is appreciated that such embodiment may be useful to other types of data, whether such data is associated with customers of an operator of a communication network, such as, for example, billing records, or other data.

The term 'time-limit', and/or 'time-limiting constraint', and/or 'time constraint' may refer to a limit on the time period for processing an input and providing a respective output so that the output is useful within a changing environment. It is appreciated that the value of any particular time-limit may change over time. A complex AI processing system may therefore have any number of time-limits, some of which may be changing independently of each other.

The term 'accuracy' may refer to a measure of the ability of an AI-model to recognize (and/or predict) a particular type of instance (e.g., element, record, event, situation, etc.). There may be several methods for calculating accuracy, for example, based on measuring values such as true positive, true negative, false positive, false negative, etc.

The term 'efficiency' may refer to a measure of the ability of an AI-model to recognize (and/or predict) any type of instance from a given input (population). Efficiency may deteriorate (or decay, or drift, etc.). For example, when the population changes and the types of instances the AI-model has been trained with are no longer present in the input.

The term 'effectiveness' may refer to a measure of the ability of a system to deliver in time the expected result. Effectiveness may be measured, also continuously, for example, based on instance latency. The term 'latency' may refer to the time an instance travels through the processing system from input to output. Effectiveness may be measured in terms of average latency, worst-case latency, percentage of late instances not processed within latency threshold, etc.

The term 'optimization process', and/or 'optimization, and/or 'optimizing', may refer to a process of optimizing a situation, where the situation may be a particular action of processing data. For example, the optimization process may involve the selection of one or more AI-models from a plurality of AI-models, and/or ordering a plurality of AI-models, to achieve an optimization goal.

The optimization goal may involve, for example, at least two opposing requirements and/or restrictions. The goal may be presented as a measure, and/or a function, having at least one maxima and/or minima resulting from the two or more opposing requirements and/or restrictions.

The optimization process may therefore seek a situation, for example, by selecting one or more AI-models from a plurality of AI-models, and/or ordering a plurality of AI-models, for achieving the goal, such as a measure, where, for example, the measure may be above a threshold (for a maximum of a respective function), or below a threshold (for a minimum of a respective function).

The term 'clustering' may refer to an AI process of creating a classification, where the classification includes a plurality of classes, and where the classes of the classification are created according to a training dataset. The term 'inferencing' may refer to an AI process of sorting, or recognizing, a plurality of instances of a dataset into classes of a particular classification. The term 'global explainability' may refer to an AI process of determining characteristics of a classification, and the characteristic values by which the inferencing process may sort instances to each class of the classification. The term 'local explainability' may refer to an AI process of determining characteristic values of a particular inferenced instance.

Figure 2:
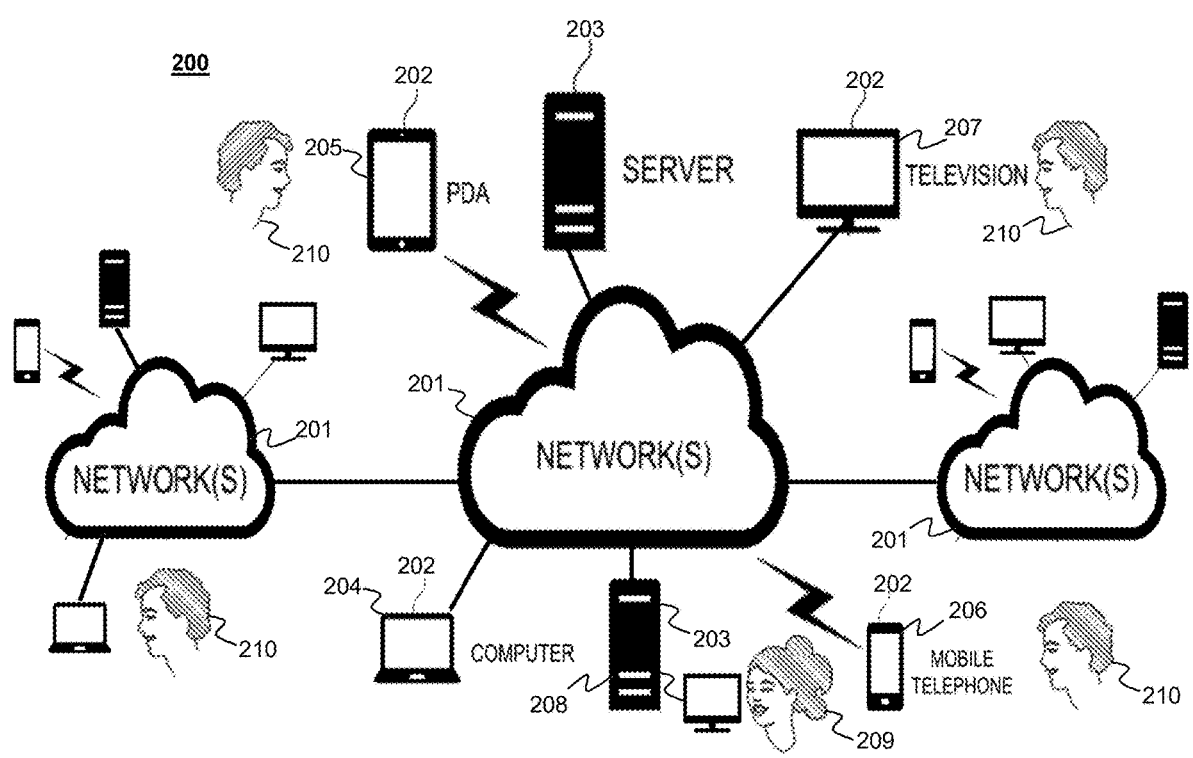
FIG. 2 illustrates a communication network and network architecture, in accordance with one embodiment.

FIG. 2 illustrates a network architecture 200, in accordance with one possible embodiment. As shown, at least one network 201 is provided. In the context of the present network architecture 200, the network 201 may take any form including, but not limited to a telecommunications network, a local area network (LAN), a wireless network, a wide area network (WAN) such as the Internet, peer-to-peer network, cable network, etc. As shown, it should be understood that two or more similar or different networks 201 may be provided.

Coupled to the network 201 is a plurality of devices, such as terminals 202 and servers 203. For example, a server computer 203 and an end user computer 204 may be coupled to the network 201 for communication purposes. Such end user computer 204 may include a desktop computer, lap-top computer, and/or any other type of logic. Still yet, various other devices may be coupled to the network 201 including a personal digital assistant (PDA) device 205, a mobile phone device 206, a television 207, etc. Further, network 201 may be managed by a network management system 208, typically operating on, or executed by, one or more servers 203.

FIG. 2 also illustrates a user 209 and one or more customers 210. User 209 may typically be an administrator of network management system 208. Customer 210 may use any one or more of terminals 2011.

Figure 3:
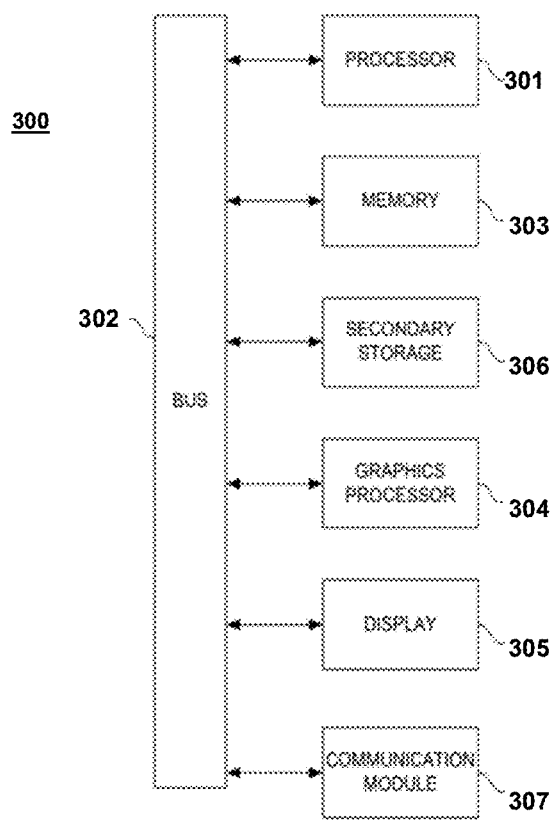
FIG. 3 illustrates an exemplary system in accordance with one embodiment.

FIG. 3 illustrates an exemplary system 300, in accordance with one embodiment. As an option, the system 300 may be implemented in the context of any of the devices and/or servers of the network architecture 200 of FIG. 2. Of course, the system 300 may be implemented in any desired environment.

As shown, a system 300 is provided including at least one central processor 301 which is connected to a communication bus 302. The system 300 also includes main memory 303 [e.g. random access memory (RAM), etc.]. The system 300 also includes a graphics processor 304 and a display 305.

The system 300 may also include a secondary storage 306. The secondary storage 306 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 303, the secondary storage 306, and/or any other memory, for that matter. Such computer programs, when executed, enable the system 300 to perform various functions (as set forth above, for example). Memory 303, storage 306 and/or any other storage are possible examples of non-transitory computer-readable media.

The system 300 may also include one or more communication modules 307. The communication module 307 may be operable to facilitate communication between the system 300 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

Figure 4:
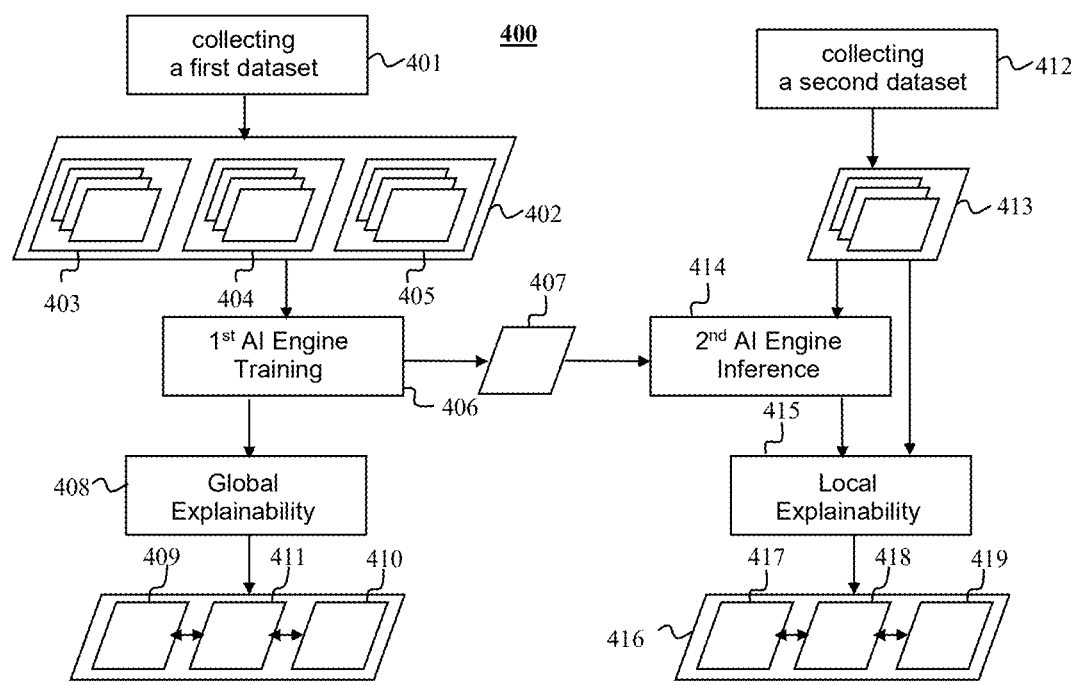
FIG. 4 illustrates a flow chart of a method for determining a billing record to be discussed in a call to a call center, in accordance with one embodiment.

FIG. 4 illustrates a flow chart of a method for determining a billing record to be discussed in a call to a call center, in accordance with one embodiment. The method may be implemented as a computational process 400. The computational process may have the form depicted in a flow-chart presented in FIG. 5.

As an option, FIG. 4 and/or process 400 may be implemented in the context of any of the devices and/or servers of the network architecture 200 of FIG. 2 and/or the system 300 of FIG. 3. Of course, the system and/or process 400 may be implemented in any desired environment.

Process 400 may start in action 401, where process 400 may collect a first dataset 402. Dataset 402 may include of at least one plurality of instances. Instances of each plurality of instances may include the same set of parameters, that may be referred to a features of the type of instance.

Dataset 402 may be produced, for example, by a call-center. In such case dataset 402 may include a plurality of customer records 403, a plurality of billing records 404, and a plurality of call-center incident records 405 (call incident records). Instances of each of these plurality of records may include records having the same set of features.

Each customer record 403 may include a customer identification, and one or more customer parameters (e.g., features). Each billing record 404 may include an identification of the billing record, an identification of the customer for which the bill applies, a billing period, and at least one billing item. A billing item may include an identification of a particular service provided to the customer during the billing period, and the charge applied.

Each call incident record 405 may include an identification of the call incident, a time stamp, an identification of the calling customer, an identification of one or more billing records discussed during the call incident, and an identification of one or more respective billing items discussed during the call incident. A call incident record 405 may also include an identification of a type or class of characterizing a result of the call incident.

Process 400 may then proceed to action 406 to process dataset 402 by a first artificial Intelligence (AI) engine to produce an AI-model 407. AI-model 407 is typically produced by training AI engine 406 with the first dataset 402, which may be produced by a call-center.

The present embodiment may assume a given population of 'instances', having a particular distribution, such as, for example, a Gaussian or an exponential distribution. This may apply to any or all of the pluralities of dataset 402, such as customer records 403, billing record 404, and incident records 405.

The present embodiment may assume that the AI system, such as training AI engine 406, may perform unsupervised classification (clustering) of any given population. Thus, the present embodiment may assume that the distribution may be divided into a mainstream part and a tail part. Typically, mainstream part may include relatively few class where each classes may include a relatively larger number of instances, and a tail part may include relatively many classes where each class may include a relatively smaller number of instances.

The present embodiment may thus assume that the AI system may successfully cluster classes of the mainstream part and may fail to cluster classes of the tail part. It is appreciated that any method of clustering, or unsupervised training, is contemplated, as well as methods of supervised training.

It is appreciated that an operator providing service to a million customers may have a tail part of the customer population that is upwards of 100,000 customers being classified ineffectively, if at all. Namely, the operator cannot make effective use of the classifications of a large part of its customer population. For example, the operator may fail to analyze the response of such customers to their respective bills.

It is appreciated that it is inefficient to try and study such large population one-by-one, and therefore it may be much more useful to learn from successful classification of other operators. However, it is expected that there is still a difference between customers of different operators, particularly in the tail part of the customer populations.

Process 400 may then proceed to action 408 to process global explainability of the AI-model 407. Action 406 together with action 408 may produce customer classifications (types) 409, and billing item classifications (types) 410, as well as a probability matrix 411. Each cell of the probability matrix 411 may represent the probability that a particular pair of customer type (class) 409 and billing item type (class) 410 may result in the customer calling the call-center to discuss the particular billing item.

Process 400 may then proceed to action 412 to collect a second dataset 413 including a plurality of new billing records to be issued to customers. Instances of dataset 413 may include the same set of features as billing records 404 of dataset 402. Consequently, each of the billing records of dataset 413 may refer to a customer record of 403 of dataset 402.

Process 400 may then proceed to action 414 to process the second dataset 413 using the AI-model 407. Action 414 may be a second AI engine, typically an inference machine.

Process 400 may then proceed to action 415 to process local explainability on the output of action 414, so as to provide a report including a plurality of records 416, where each record may indicate a billing record 417 having probability higher than the predefined threshold to cause a customer to call the call-center, an identification of the customer 418 associated with the billing record having probability higher than the predefined threshold, and the billing item type 419 having highest probability to be discussed by the customer in the anticipated call to the call-center.

Figure 5:
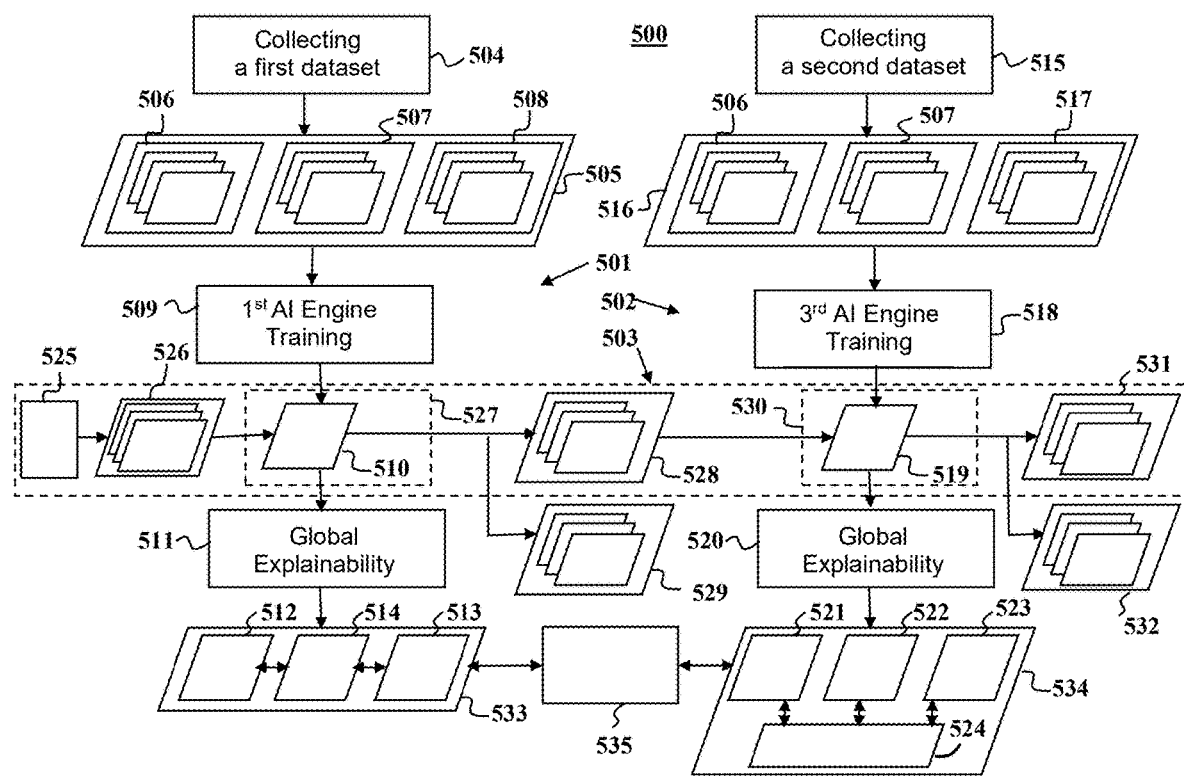
FIG. 5 illustrates a flow chart of an alternative method and system for determining a billing record to be discussed in a call to a call center, in accordance with one embodiment.

FIG. 5 illustrates a flow chart of a second method and system 500 for determining a billing record to be discussed in a call to a call center, in accordance with one embodiment.

As an option, the method and system 500 may be implemented in the context of any of the devices and/or servers of any of the devices and/or servers of the network architecture 200 of FIG. 2 and/or the system 300 of FIG. 3, or any of the previous Figures. Of course, the method and system 500 may be implemented in any desired environment.

Method and system 500 may include three parts, or processes, a first process 501 a second process 502, and a third process 503, where process 501 may be substantially similar to process 400 as shown and described with reference to FIG. 4.

Process 501 may start in action 504 by collecting a first dataset 505 that may include a plurality of customer records 506, a plurality of billing records 507, and a plurality of call-center incident records 508 (call incident records).

As in dataset 402, dataset 505 may include at least one plurality of instances. Particularly, dataset 505 may include three such pluralities. Instances of each plurality of instances may include the same set of parameters, that may be referred to a features of the type of instance. A plurality of dataset 505 may include a mainstream part and a tail part as described above with reference to dataset 402.

Each customer record 506 may include a customer identification, and one or more customer parameters. Each billing record 507 may include an identification of the billing record, an identification of the customer for which the bill applies, a billing period, and at least one billing item. A billing item may include an identification of a particular service provided to the customer during the billing period, and the charge applied.

Each call incident record 508 may include an identification of the call incident, a time stamp, an identification of the calling customer, an identification of one or more billing records discussed during the call incident, and an identification of one or more respective billing items discussed during the call incident. A call incident record 405 may also include an identification of a type or class of characterizing a result of the call incident.

For example, each of these parameters indicated for each of the record types cited above may be referred to as a feature, and, for example, each of the records (instances) of the same plurality of records (instances), may have the same set of features.

Process 501 may then proceed to action 509 to process dataset 505 by a first AI engine to produce an AI-model 510. In this respect action 509 may be viewed as an AI engine being trained using dataset 505 to produce AI-model 510.

It is appreciated that AI engine 509 may perform unsupervised clustering of any of the above mentioned populations, that any of these populations may have a distribution that may be divided into a mainstream part and a tail part in the sense described above, and that AI engine 509 may successfully cluster classes of the mainstream part and may fail to cluster classes of the tail part. It is appreciated that any method of clustering, or unsupervised training, is contemplated, as well as methods of supervised training.

Process 501 may then proceed to action 511 to process global explainability of the AI-model 510. Action 509 together with action 511 may produce customer classifications (types) 512, and billing classifications (types) and/or billing item classifications (types) 513, as well as a probability matrix 514. Each cell of the probability matrix 514 may represent the probability that a particular pair of customer type (class) 512 and billing item type (class) 513 may result in the customer calling the call-center to discuss the particular billing item.

Process 502, optionally in parallel to process 501, may start in action 515, by collecting a second dataset 516, for example from the call center producing the first dataset 504. Dataset 516 may include a plurality of customer records 506, a plurality of billing records 507, and a plurality of call-center incident records 517 (call incident records) indicating that the discussion with the customer has reached a resolution.

Process 502 may than proceed to action 518 to process dataset 516 by a third AI engine to produce a second AI-model 519. Action 518 may be viewed as an AI engine being trained using dataset 516 to produce AI-model 519.

It is appreciated that the description of dataset 505 and AI engine 509 above with respect to the division of the respective distributions into mainstream part and a tail part, as well as the clustering and classification of the respective distributions, may also apply to dataset 516 and AI engine 518.

Process 502 may than proceed to action 520 to process global explainability of the AI-model 519. Action 518 together with action 520 may produce a plurality of customer classifications (types) 521, plurality of billing classifications (types), and/or billing item classifications 522, and plurality of resolution classifications (types) 523, as well as a probability matrix 524. Each cell of the probability matrix 514 may represent the probability that a particular triplet of customer type (class) 521, billing type (class) 522, and resolution type 523 may result in a resolution to a problem raised by the customer.

Process 503 may be initiated after process 501 and process 502 have produced their respective AI model 510 and AI model 519. Process 503 may start with action 525 to collect a third data set including a plurality of new billing records 526, which may be produced, for example, by an external billing system (not shown in FIG. 5).

Process 503 may then proceed to action 527 to process the third dataset of billing records 526, to produce a fourth dataset 528 including a plurality of records, where each records identified a potential call incident. Namely, that there is a probability surpassing a predetermined probability threshold that a particular customer may call the call-center for an issue associated with the particular billing record. In this respect, action 527 may be viewed as an AI inference machine using AI-model 510 to process dataset 526 to determine potential call incidents provided as dataset 528.

Each record of the fourth dataset 528 may identify a billing record, and preferably also a billing item of the billing record, as well as the customer associated with the billing record, where their combination has a particular probability (greater than the probability threshold) to cause the respective customer to call the call-center.

Each record of the fourth dataset 528 may include a customer identification (or an identification of a customer record), a billing record identification (or an identification of a billing record), and a billing item identification (or an identification of a billing item record).

Action 527 may also produce a dataset 529 of billing records not identifying a problem that may result in the respective customer calling the call-center. Or, alternatively, or additionally, a dataset 529 of billing records for which the probability that the customer may call the call-center for any problem associated with the billing record is below the probability threshold. For example, dataset 529 may include all records of dataset 526 not included in dataset 528.

Process 503 may then proceed to action 530 to process the fourth dataset 528, using AI-model 519, to produce a fifth dataset 531 including a plurality of records, where each records identified a potential resolution to the respective call incident of the respective record of the fourth dataset 528. Namely, that there is a probability surpassing a predetermined probability threshold that a particular resolution may cause the respective customer to avoid calling the call-center for the particular issue associated with the particular billing record. In this respect, action 530 may be viewed as an AI inference machine using AI-model 519 to process dataset 528 to determine potential resolutions to potential call incidents, the potential resolutions may be provided as dataset 531.

Each record of the fifth dataset 531 may include a customer identification (or an identification of a customer record), a billing record identification (or an identification of a billing record), a billing item identification (or an identification of a billing item record), and a resolution type, as well as the probability that the resolution is accepted by the respective customer.

Action 530 may also produce a dataset 532 of billing records not identifying a problem that may result in the respective customer calling the call-center. Or, alternatively, or additionally, a dataset 532 of billing records for which the probability that the customer may call the call-center for any problem associated with the billing record is below the probability threshold. For example, dataset 532 may include all records of dataset 528 not included in dataset 531.

It is appreciated that the fifth dataset 531 may be communicated to the (external) billing system to correct the billing records so as to avoid the anticipated customer's call to the call-center.

It is appreciated that process 503 may be a repetitive process, and/or continuous process, and that the entire method and system 500 may be a repetitive process, and/or continuous process.

It is appreciated that the classification 533 of process 501 may be different from the classification 534 of process 502. For example, the customer types (classes) 512 may be different from the customer types (classes) 521. For example, the billing item types (classes) 513 may be different from the billing item types (classes) 522.

It is appreciated that the fourth dataset 528 may include the classification of the respective customer, and/or billing record, and/or billing item, and that the AI-model 519 may consider these classifications. Hence there may be a motivation to associate the classes (types, labels) of classification 533 with the classes (types, labels) of classification 534. It is appreciated that a fourth process 535 may produce association between each of the classes of classification 533 and each of the classes of classification 534, optionally as a one-to-one (injective) relation.

For example, the classes of the customer classification 512 may be divided, and/or the classes of the customer classification 521 may be divided, or both can be divided, so that each customer class of customer classification 512 has a unique corresponding customer class of customer classification 521. Alternatively or additionally, the classes of the billing record and/or item classification 513 may be divided, and/or the classes of the billing record and/or item classification 522 may be divided, or both can be divided, so that each class of billing record and/or item 513 has a unique corresponding class of billing record and/or item classification 522.

If AI-model 510 is successful in determining billing records, and/or billing items that are likely to cause a call to the call-center, and if AI-model 519 is successful in determining a solution to the problem associated with the billing records and/or billing billing items as determined by AI-model 510, and if these causes for call incidents (customer call to the call-center) are resolved in the bill before it is sent to the customer, then these call incidents will disappear from the data produced by the call-center. The same applies to process 400 of FIG. 4.

In other words, method and system 500 may be executed repeatedly. Particularly, process 503 may process new third dataset of billing records 525, every time such dataset is produced by the billing system. If method and system 500 is successful in avoiding particular types of call incidents than these types of call incidents will not appear in later third dataset of billing records 525, and method and system 500 may have nothing to detect and/or resolve. In other words, the success of method and system 500 is bound to deteriorate the effectiveness of its AI-model 510 and/or AI-model 519. The same applies to process 400 of FIG. 4.

As time passes, the call-center may produce new and/or updated first dataset 505 and/or second dataset 516. Consequently method and system 500 may be repeated from time to time to process the new and/or updated first dataset 505 and/or second dataset 516. For example to train a new or/or updated AI-model 510 and/or AI-model 519, and/or to generate new respective classifications 533 and/or 534. However, if method and system 500 is successful than the causes relevant to the success will disappear from later datasets. Hence, later AI-model 510 and/or AI-model 519 will not be able to detect and/or resolve earlier causes. The term 'earlier causes' may refer to billing problems and/or respective call incidents that earlier AI-model 510 and/or AI-model 519 were able to detect and resolve. The same applies to process 400 of FIG. 4.

First dataset 505 and/or second dataset 516 may be cumulative or periodical. A cumulative dataset 505 and/or 516 may be accumulated over, or produced for, a long period of time to date. A periodical dataset 505 and/or 516 may be produced for a particular period.

Figure 6:
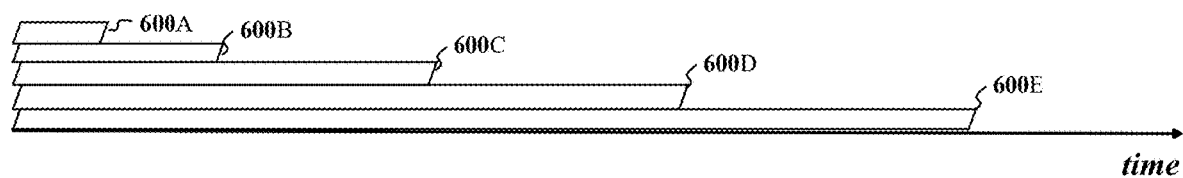
FIG. 6 illustrates a block diagram of a sequence of cumulative datasets, in accordance with one embodiment.
Figure 7:
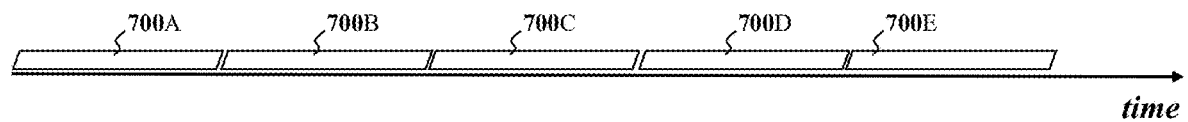
FIG. 7 illustrates a block diagram of a sequence of sequentially periodical datasets, in accordance with one embodiment.
Figure 8:
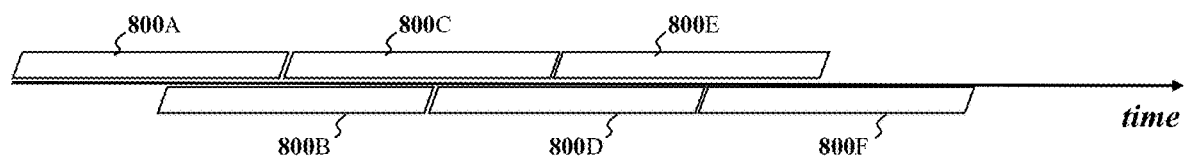
FIG. 8 illustrates a block diagram of a sequence of partially overlapping periodical datasets, in accordance with one embodiment.

FIG. 6 illustrates a block diagram of a sequence of cumulative datasets 600, in accordance with one embodiment. FIG. 7 illustrates a block diagram of a sequence of sequentially periodical datasets 700, in accordance with one embodiment. FIG. 8 illustrates a block diagram of a sequence of partially overlapping periodical datasets 800, in accordance with one embodiment.

As an option, the datasets 600, and/or 700 and/or 800 may be implemented in the context of any of the previous Figures. Of course, the method and system 500 may be implemented in any desired environment.

Any of the datasets 600, and/or 700 and/or 800 may represent any of the datasets 402 and/or 413 of FIG. 4, and/or any of the datasets 505 and/or 516 (as well as dataset 525) of FIG. 5. In other words, for example, dataset 600A represents a sampling A, for example, by actions 504 and/or 515, creating respective datasets 505A and/or 516A, for the same time period A.

Similarly, dataset 600B represents a sampling B (for example, by actions 504 and/or 515) of datasets 505 and/or 516 (as well as dataset 525) of FIG. 5, creating respective datasets 505B and/or 516B.

Similarly, datasets 700A and 700B represent samplings A and B of datasets 505 and/or 516 (as well as dataset 525), and datasets 800A and 800B represent samplings A and B of datasets 505 and/or 516 (as well as dataset 525).

As shown in FIG. 6, datasets 600A, 600B, 600C, 600D, and 600E represent cumulative datasets accumulated over different respective time periods A, B,C, and D. As shown in FIG. 6, datasets 600A, 600B, 600C, 600D, and 600E may start in the same time and end in different times. As disclosed above, each of the datasets 600A, 600B, 600C, 600D, and 600E may represent a respective dataset 402, and/or a dataset 413. Similarly, each of the datasets 600A, 600B, 600C, 600D, and 600E may represent a respective dataset 505 and/or 516 (as well as dataset 525). The same applies to FIGS. 7 and 8.

On one hand, cumulative datasets 600 include all billing records and call incidents, including problems associated with billing items as well as respective resolutions. Therefore, datasets 600 include types call incidents, problems and resolutions that may disappear with time as a result of the success of the method and system 500 (or process 400). Therefore, a process such as method and system 500 for processing datasets 600 is simpler than processing datasets 700 and/or 800. It is appreciated that processing a dataset 600 involves operating all the actions of method and system 500.

On the other hand, the old and fading call incidents, problems and resolutions are slowly diluted withing the later datasets, so that later generated AI-models may not be able to detect them. Further, old data that is not currently useful may be diluting new types of call incidents, problems, and resolutions so that later generated AI-models may not be able to detect the new call incidents, problems, and resolutions.

As shown in FIG. 7, datasets 700A, 700B, 700C, 700D, and 700E represent periodical datasets sampled sequentially over subsequent different time periods. As shown in FIG. 7, each of datasets 700A, 700B, 700C, 700D, and 700E may start after the previous sampling period has ended. Datasets 700A, 700B, 700C, 700D may have any length of sampling time.

As shown in FIG. 8, datasets 800A, 800B, 800C, 800D, 800E, and 800F represent periodical datasets sampled sequentially over partially overlapping different time periods. As shown in FIG. 8, each of datasets 800 may start before a previous sampling period has ended to have a partially overlapping period with at least one previous dataset 800. Datasets 800 may have any length of sampling time. This arrangement of overlapping sampling periods enable longer sampling periods, and hence a dataset including more data records, and yet a higher sampling frequency (e.g., more datasets) as compared with datasets 700 of FIG. 7.

It is appreciated that each of the pair of datasets 505 and 516 for the same sampling period, such as pair 505A and 516A of datasets 600A, the two datasets 505A and 516A may have mutually correlated types (classes), associated by action 535 of FIG. 5. This may apply to all pairs such as datasets 505B and 516B of datasets 700B, datasets 505C and 516C of datasets 800C, etc.

Figure 9:
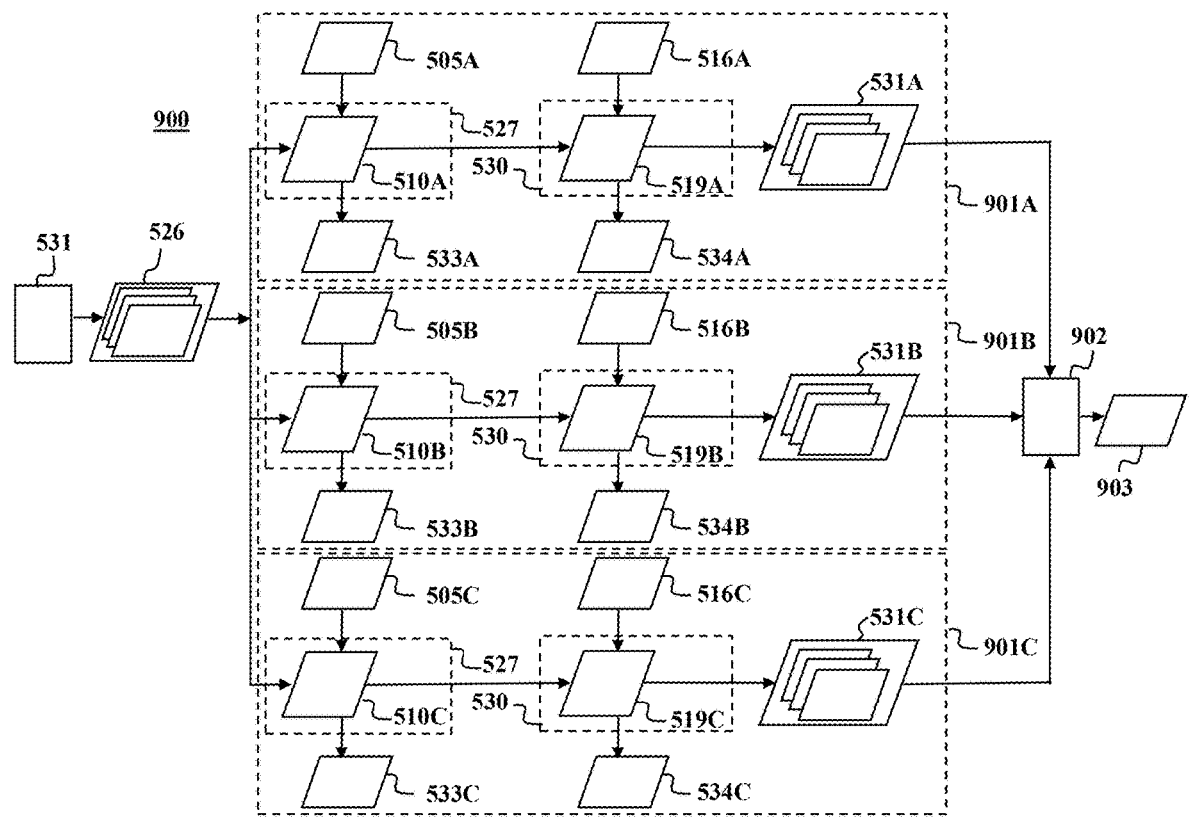
FIG. 9 illustrates a block diagram of method and system for parallel processing of cumulative datasets, in accordance with one embodiment.

FIG. 9 illustrates a block diagram of method and system 900 for parallel processing of datasets 700 and/or 800, in accordance with one embodiment. As an option, the method and system 900 may be implemented in the context of any of the previous Figures. Of course, the method and system 900 may be implemented in any desired environment.

As shown in FIG. 9, method and system 900 may have a plurality of sub-processes 901. Method and system 900 of FIG. 9 shows three sub-processes 901 enumerated 901A, 901B, and 901C. Each sub-process 901 represents a complete method and system 500, though only few elements of method and system 500 are shown in FIG. 9. It is appreciated that method and system 900 may have any number of processes 901.

As shown in FIG. 9, each of the sub-processes 901 may be trained with a different dataset 700 or 800, representing a sampling of datasets 505 and/or 516. For example, as shown in FIG. 9, sub-process 901A may be trained with dataset 700A, which is represented in FIG. 9 as datasets 505A and 516A.

Similarly, sub-process 901B may be trained with dataset 700B represented in FIG. 9 as datasets 505B and/or 516B. Similarly, sub-process 901C may be trained with dataset 700C represented in FIG. 9 as datasets 505B and/or 516B.

It is appreciated that method and system 900 may have any number of processes 901 processing a respective number of generations A, B, C, D, etc. of periodical datasets 700.

Alternatively, for example, sub-process 901A may be trained with dataset 800A represented in FIG. 9 as datasets 505A and 516A. Sub-process 901B may be trained with dataset 800B represented in FIG. 9 as datasets 505B and 516B. And sub-process 901C may be trained with dataset 800C represented in FIG. 9 as datasets 505C and/or 516C. It is appreciated that method and system 900 may have any number of processes 901 processing a respective number of generations A, B, C, D, etc. of periodical datasets 800.

Method and system 900 may therefore be trained with a plurality of dataset 700 or 800. Thereafter a new input dataset 526, collected from a billing system, may be provided to each of the subprocesses 901A, 901B, and 901C. Thereafter, each of sub-processes 901A, 901B, and 901A may produce a respective output 531A, 531B, and 531C.

It is appreciated that each of the pairs of datasets 505 and 516 for the same sampling period and sub-processes 901 may have mutually correlated types (classes), as associated by action 535 of FIG. 5. In this respect, datasets 505A and 516A of sub-processes 901A may have mutually correlated types (classes), associated by action 535 of FIG. 5. Similarly, datasets 505B and 516B of sub-processes 901B may be mutually correlated types, as well as datasets 505C and 516C of sub-processes 901C. Therefore, the types (classes) of each such pair of datasets 505 and 516 may be independently correlated.

Optionally and/or additionally, the outputs 531A, 531B, and 531C of processes 901A, 901B, and 901C may be provided to a comparator action 902. For example, an instance (record) of input dataset 526 may be recognized by two or more processes 901 producing two respective records 531. These two (or more) records 531 may be compared by comparator action 902 to select the best for example according to a predefined criterion. The selected records are then provided as the output 903 of method and system 900.

The criterion may be, for example, the resolution (solution) having the highest probability of being accepted by the respective customer. Other criteria are contemplated, for example, the combined probability of recognition by the respective pair of AI models 510 and 519.

Figure 10:
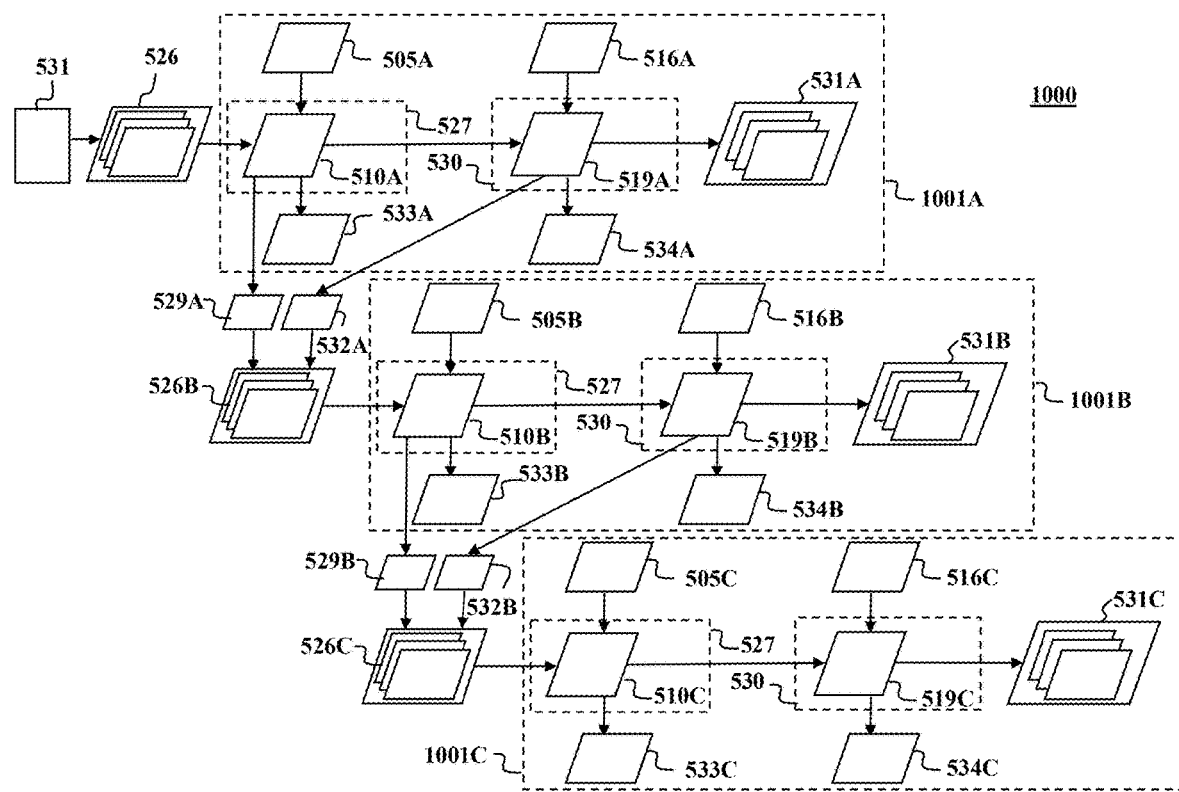
FIG. 10 illustrates a block diagram of method and system for sequential processing of periodical datasets, in accordance with one embodiment.

FIG. 10 illustrates a block diagram of method and system 1000 for sequential processing of datasets 700 and/or 800, in accordance with one embodiment. As an option, the method and system 1000 may be implemented in the context of any of the previous Figures. Of course, the method and system 1000 may be implemented in any desired environment.

As shown in FIG. 10, method and system 1000 may have a plurality of sub-processes 1001. Method and system 1000 of FIG. 10 shows three sub-processes 1001 enumerated 1001A, 1001B, and 1001C. Each sub-process 1002 represents a complete method and system 500, though only few elements of method and system 500 are shown in FIG. 10.

Each of the sub-processes 1001A, 1001B, and 1001C may be trained by a respective dataset 700A, 700B, 700C, or by a respective dataset 800A, 800B, 800C. Dataset 700A or 800A is represented in FIG. 10 by datasets 505A and 516A, dataset 700B or 800B is represented in FIG. 10 by datasets 505B and 516B, and dataset 700C or 800C is represented in FIG. 10 by datasets 505C and 516C.

The training by dataset 700A or 800A produces the respective AI-models 510A and 519A of 1001A. The training by dataset 700B or 800B produces the respective AI-models 510B and 519B of 1001B. The training by dataset 700C or 800C produces the respective AI-models 510C and 519C of 1001C.

Returning to FIG. 5, Action 527, using AI model 510, may produce a dataset 528 including a plurality of records, where each records identified a potential call incident. Namely, that there is a probability surpassing a predetermined probability threshold that a particular customer may call the call-center for an issue associated with the particular billing record. Dataset 528 (not shown in FIG. 10) may be provided to the input of action 530 to process the fourth dataset 528, using AI-model 519, to produce a fifth dataset 531.

Additionally, action 527 may also produce a dataset 54 of billing records not identifying a problem that may result in the respective customer calling the call-center. Or, alternatively, a dataset 529 of billing records for which the probability that the customer may call the call-center for any problem associated with the billing record is below the probability threshold.

Similarly, action 530, using AI model 519, may produce the fifth dataset 531 including a plurality of records, where each records identified a potential resolution to the respective call incident of the respective record of the fourth dataset 528. Namely, that there is a probability surpassing a predetermined probability threshold that a particular resolution may cause the respective customer to avoid calling the call-center for the particular issue associated with the particular billing record.

Additionally action 530 may also produce dataset 532 of billing records not identifying a problem that may result in the respective customer calling the call-center. Or, alternatively, dataset 532 may include billing records for which the probability that the customer may call the call-center for any problem associated with the billing record is below the probability threshold.

As shown in FIG. 10, dataset 529A, and dataset 532A, produced by sub-process 1001A, may be combined as dataset 526B to be provided to the input of sub-process 1001B. Similarly, dataset 529B, and dataset 532B, produced by sub-process 1001B, may be combined as dataset 526BC to be provided to the input of sub-process 1001C, and so on.

It is appreciated that preferably the first sub-process to process that current dataset 526, namely sub-process 1001A, may be trained with the latest dataset of the 700 and/or 800 datasets, namely dataset 700E, or dataset 800F. In other words, datasets 505A and 516A may be derived from dataset 700E, or dataset 800F. The following sub-process 1001B, may be trained with the next latest (penultimate) dataset of the 700 and/or 800 datasets, namely dataset 700D, or dataset 800E. In other words, datasets 505B and 516B may be derived from dataset 700D, or dataset 800E. Consequently, sub-process 1001C, may be trained with the previously sampled dataset of the 700 and/or 800 datasets, namely dataset 700C, or dataset 800D. In other words, datasets 505C and 516C may be derived from dataset 700C, or dataset 800D. In this way only those records that are not determined for cause and/or resolution according to the most current datasets produced by the call-center, are then processed according to datasets produced by the call-center earlier.

It is appreciated that each of the pairs of datasets 505 and 516 for the same sampling period and sub-processes 1001 may have mutually correlated types (classes), as associated by action 535 of FIG. 5. In this respect, datasets 505A and 516A of sub-processes 1001A may have mutually correlated types (classes), associated by action 535 of FIG. 5. Similarly, datasets 505B and 516B of sub-processes 1001B may be mutually correlated types, as well as datasets 505C and 516C of sub-processes 1001C. Therefore, the types (classes) of each such pair of datasets 505 and 516 may be independently correlated.

It is appreciated that the use of any of process 400 of FIG. 4 and/or method and system 500 of FIG. 5, and/or method and system 900 of FIG. 9, and/or method and system 1000 of FIG. 10, may reduce the cost of operating a call center by detecting, in a bill to be issued to a customer, a potential cause for the customer to call the call center, by determining a potential resolution for the cause to call the call center, and thereafter by amending the bill before it is issued to the customer. Therefore the call incident is avoided and the cost of operating the call center is removed.

The general process of reducing the cost of operating the call center may start by collecting a first dataset including customer calls to a call-center, where each call is related to a particular bill. The dataset includes date and time of the call, customer identification of the customer calling the call-center, complete billing data, the billing item discussed in the call and optionally also billing data not discussed in the call, the result of the call, and cost estimation of the call.

A first AI-model is then developed to characterize and detect pairs of a customer type and a billing item type that have high probability to result in a call to the call center. There are two steps here: the first step involves characterizing the types (customer and bill), and the second step involves the AI model to determine if the particular bill is likely to result in a call to the call center.

A second dataset is collected including actions taken to resolve problems associated with billing items. The dataset includes date and time of the call, customer identification of the customer calling the call-center, complete billing data, the item discussed in the call and optionally also billing data not discussed in the call, the compensation offered to the customer, the compensation accepted by the customer and cost estimation of the compensation accepted by the customer.

A second AI-model is then developed to characterize and detect triplets of a customer type, a billing item type, and the resolution/offer/compensation that have high probability to be accepted by the customer. There are two steps here: the first step involves characterizing the types (customer, billing item, and compensation), and the second step involves the AI model to determine if the customer-billing-item has a candidate compensation.

The actions of developing the first and the second AI-models are iterated until each billing item of billing item types of the first dataset is associated with a billing item of billing item types of the second dataset. Namely, both AI-models can detect respective pairs/triplets for each, and any billing item types. The customer classification/characteristics may be different for the two datasets/AI-models.

Thereafter, the first AI model is used to scan customer bills before they are sent to customers to detect customer-billing-item pairs that surpass a predefined load threshold. The load threshold may be the probability the customer may call the call-center, or the cost expectancy (probability multiplied by the cost of handing the customer call), or the ratio between the cost of handing the customer call and the value of the billing item, etc.

Thereafter, for the customer-billing-item pairs that surpass the predefined load threshold, the second AI model is used to determine possible resolutions (triplets) for each customer-billing-item pair, and to select a preferred resolution, for example, by calculating a selection criterion such as the probability that the customer may concede, or the concession expectancy (concede probability multiplied by the inverse of the cost of the offer), or the ratio between the cost of handing the customer call and the cost of the offer, etc.

The concession expectancy may represent, for example, a combination of probability and cost of resolution. Therefore, for example, the preferred resolution may have a combination of relatively high probability and relatively low cost of resolution. concession expectancy may be calculated, for example, as concede probability multiplied by the inverse of the cost of the offer. In this respect, the inverse of the cost of the offer may be represented, for example, as the value "1" divided by the value of the cost of the offer. Other formulas are also contemplated.

The process described above may be executed in parallel as shown and described above with reference to FIG. 9, for different, temporally dispersed, datasets such as shown and described above with reference to FIG. 6, and/or FIG. 7.

Alternatively, The process described above may be executed in a pipeline mode as shown and described above with reference to FIG. 10, for different, temporally dispersed, datasets such as shown and described above with reference to FIG. 7, and/or FIG. 8.

As disclosed above, each of the datasets of FIG. 6, namely datasets 600A, 600B, 600C, etc., may be used to train a respective AI-model 407 of FIG. 4, and/or respective AI-models 510, and/or 519 of FIG. 5. Similarly, each of the datasets of FIG. 7, namely datasets 700A, 700B, 700C, etc., may be used to train a respective AI-model 407A, 407B, and 407C, and/or respective AI-models 510A, 510B, and 510C as well as AI-models 519A, 519B, and 519C. Similarly, each of the datasets of FIG. 8 (namely, datasets 800A, 800B, 800C, etc.,), may be used to train a respective AI-model 407A, 407B, and 407C, and/or respective AI-models 510A, 510B, and 510C as well as AI-models 519A, 519B, and 519C.

A dataset, such as customer records 403, and/or of billing records 404, and/or call-center incident records 405 of FIG. 4, may include a population of instances, for example, in the form of records. The instances of a dataset may have a particular distribution that can be divided into two parts, a mainstream part and a tail part. The tail part may be defined as having types, or classes of instances, or data records representing the instances, having a number of instances (or data records) below a threshold number, or below a threshold percentage of the entire dataset, or where the accuracy of instance recognition by the respective AI-model is below a threshold, etc.

It is appreciated that the tail part may include one or more types of instances that are too few to train the respective AI-model, such as AI-model 407 to recognize such instances as a class of its own. It is appreciated that the same applies to customer record 506, billing record 507, call incident record 508, and call-center incident records 517 of FIG. 5, as well as AI-model 510, and/or AI-model 519.

Two (or more) datasets of the same type, for example, two datasets of customer records 403, may be substantially similar in their mainstream part, but different in their tail part. Such two (or more) datasets may represent customer records (or any other type of records) collected from two different geographical regions, such two (or more) datasets may represent customer records (or any other type of records) collected in different time periods, such as the datasets of FIG. 6, and/or FIG. 7, and/or FIG. 8. Such two (or more) datasets may represent customer records (or any other type of records) collected by different operators.

For example, a tail part of a first dataset of the above two (or more) datasets may have enough instances of a particular type to enable the training of a first AI-model, such as AI-model 407, to recognize instances of the particular type. A second dataset of the above two (or more) datasets may not have enough instances of the particular type so that the respective second AI-model cannot recognize instances of the particular type. However, the first AI-model nay be able to recognize instances of the particular type in the second dataset. Obviously, the above may work the other way round, where the second AI-model may be trained to recognize instances that the first AI-model may not recognize.

Figure 11:
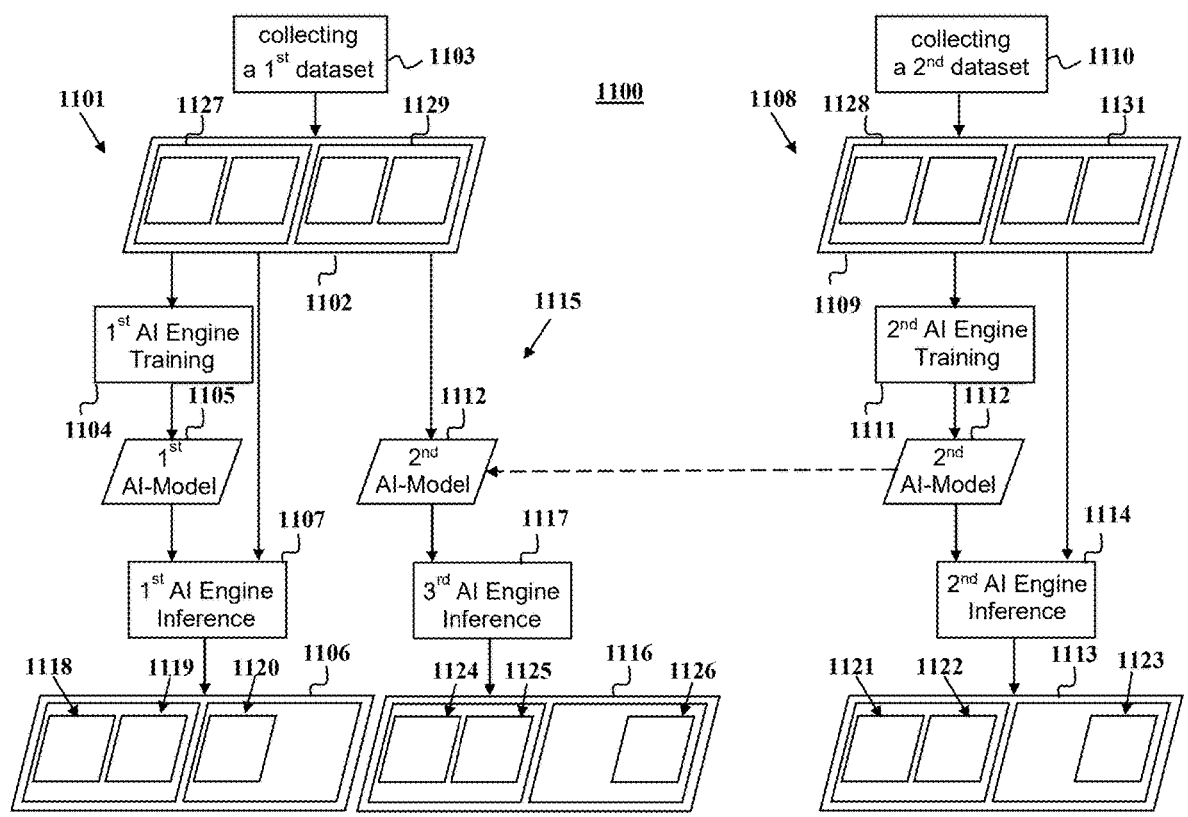
FIG. 11 illustrates a block diagram of a method and system for determining an outlier data in a dataset, in accordance with one embodiment.

FIG. 11 illustrates a block diagram of a method and system 1100 for determining an outlier data in a dataset, in accordance with one embodiment.

As an option, the method and system 1100 may be implemented in the context of any of the devices and/or servers of any of the devices and/or servers of the network architecture 200 of FIG. 2 and/or the system 300 of FIG. 3, or any of the previous Figures. Of course, the method and system 1100 may be implemented in any desired environment.

Method and system 1100 may include the following processes:

A first process 1101 using a first dataset 1102, collected in action 1103, to train, in training action 1104, a first AI-model 1105 to determine a first classification 1106 of the first dataset 1102, and/or to recognize, by inference action 1107, at least one record of the first dataset 1102 according to classification 1106.

A second process 1108 using a second dataset 1109, collected in action 1110, to train. in training action 1111, a second AI-model 1112 to determine a second classification 1113 of the second dataset 1109, and/or to recognize, in inference action 1114, at least one record of the second dataset 1109 according to classification 1113.

A third process 1115 is an inferencing process ($3^{rd}$ inferencing process) that uses the second AI-model 1112 to determine a third classification 1116. This third classification 1116 is another (second) classification of the first dataset 1102, using the second AI-model 1112. Additionally or alternatively inference action 1117 of process 1115 may recognize at least one record of the first dataset 1102 according to the third classification 1116.

It is appreciated that such one or more data records (instances) of the first dataset 1102 that inference action 1117 may recognize, may not be recognized as such by inference action 1107 of the first process 1101. In other words, as AI-model 1105 and AI-model 1112 may generate different respective classifications 1106 and 1116, respective inference actions 1107 and 1117 may recognize one or more data records of the first dataset 1102 in a different manner, that is, classify the data record in a different class. Alternatively, inference action 1117 may recognize a data record that inference action 1107 may not recognize at all.

As shown in the example of FIG. 11, the first inference process 1107, when using the first AI-model 1105, may classify (divide) the population of the first dataset 1102 into classification 1106, which may include several types, or classes of records of various instances, such as classes 1118, 1119, and 1120.

Similarly, the second inference process 1114, when using the second AI-model 1112, may classify (divide) the population of the second dataset 1109 into classification 1113, which may include several types, or classes of records of various instances, such as classes 1121, 1122, and 1123.

However, the third inference process 1117, when using the second AI-model 1112, may divide the population of the first dataset 1102 into classification 1116, which may include several types, or classes of records of various instances, such as classes 1124, 1125, and 1126.

It is appreciated that some of the classes of classification 1116 may be similar to some the classes of classification 1106, and may thus include the same instances. However, one or more of the classes of classification 1116 may be similar to one or more classes of classification 1113, however including instances of dataset 1102.

The population of classes 1118, 1119 may be part of a mainstream part 1127 of dataset 1102, and the population of classes 1121 and 1122 may be part of a mainstream part 1128 of dataset 1109. If the datasets 1102 and 1109 represent similar populations, such as customers of an operator, it is likely that the characterizing parameters (e.g., features) of mainstream classes will be substantially similar. Therefore, the characterizing parameters of classes 1124 and 1125 may be similar to the characterizing parameters of classes 1118 and 1119, respectively.

It is appreciated that the term similar features, and/or similar characterizing parameters, may refer to similar values, or value ranges, of the respective features, and/or parameters of respective classes.

Hence, the characteristics parameters of class 1118 may be similar to the characterizing parameters (e.g., features) of class 1124, and therefore the population of the class 1118 may be similar to the population (instances) of class 1124. Similarly, the characterizing parameters of class 1119 may be similar to the characteristics parameters of class 1125, and therefore the population (instances) of the class 1119 may be similar to the population of class 1125.

However, class 1120 may be part of the tail part 1129 of dataset 1102, and class 1130 may be part of the tail part 1131 of dataset 1109. Datasets 1102 and 1109 may differ in the tail part in a sufficient manner to cause the second AI-model 1112 to create characterizing parameters (e.g., features) that may enable the third inference process 1117 to recognize instances of class 1126, which the first AI-model 1105 cannot.

It is appreciated that though class 1126 and class 1123 may have the same characterizing parameters (e.g., features) with respect to AI-model being the same AI-model 1112, at least some actual characteristics of the respective populations of class 1126 and class 1123 may be different, because the respective tail populations of datasets 1102 and 1109 may be different.

In this respect, class 1126 is new in the sense that it is not part of classification 1106. In this respect, instances of class 1126, while being instances of dataset 1102, may be instances of one or more classes of classification 1106, such as class 1120 or class 1119, etc. However, these same instances may have a higher probability when recognized as instances of class 1126, then their probability when recognized as instances of any class of classification 1106.In this respect, method and system 1100 may use the second AI-model 1112 trained with dataset 1109, to detect the hidden class 1126 of dataset 1102, where the instances of hidden class 1126 are hiding in other classes of classification 1106.

Method and system 1100 may therefore determine that these instances of class 1126 may be associated with class 1126 rather than any of another class of classification 1106 by comparing the probability of recognition as a member of class 1126 and the probability of recognition any of another class of classification 1106, and associating the instance with the class having higher recognition probability.

Method and system 1100 may now combine any new class produced by the process 1115 such as class 1126, with the classes of classification 1106, for example,by creating a new AI-model that can classify instances of dataset 1102 into the new classification combining classes of classification 1106 and class 1126.

For example, method and system 1100 may label the instances according to their respective classes, and particularly instances of class 1126, and train the new AI-model to recognize the instances as labeled. If the number of instances of class 1126 is too small to properly train the new AI-model, method and system 1100 may synthesize instances that are similar to the instances of dataset 1102 that are associated with class 1126.

Hence, method and system 1100 may first obtain a first dataset including a first plurality of instances having a first set of features. Then, method and system 1100 may train a first AI-model to cluster the first plurality of instances into a first classification including a first plurality of classes, and/or recognize one or more instances of the first dataset according to a class (or classes) of the first plurality of classes.

Method and system 1100 may then obtain a second AI-model, which has been created by training using a second dataset, which may include a second plurality of instances. Instances of the second plurality of instances may have the same first set of features as first plurality of instances of the first dataset. The second AI-model being trained to cluster the second plurality of instances into a second classification including a second plurality of classes, and/or to recognize at least one instance of the second dataset according to a class (or classes) of the second plurality of classes.

Method and system 1100 may then use the second AI-model to recognize at least one of instance of the first plurality of instances according to a class of the second classification that is not included in the first classification.

Method and system 1100 may also, or alternatively, use the second AI-model to recognize one or more instances of the first plurality of instances according to a class of the second classification with recognition probability being higher than recognition probability of the instance of the first plurality of instances according to any class of the first classification.

Method and system 1100 may also, or alternatively, use the second AI-model to recognize at least one instance of the first dataset not recognized by the first AI-model.

Method and system 1100 may also, or alternatively, use the second AI-model to recognize the one or more instances of the first plurality of instances according to a class of the second classification that is not included in the first classification, optionally with recognition probability being higher than recognition probability of the at least one of instance of the first plurality of instances according to any class of the first classification.

It is appreciated that the second plurality of instances may be different from the first plurality of instances, and that method and system 1100 may also obtain the first plurality of instances and the second plurality of instances from different sources. In this respect, the first plurality of instances and the second plurality of instances may be obtained from different business entities. Optionally, or alternatively, the first plurality of instances and the second plurality of instances may be obtained from different geographical regions.

Alternatively, or additionally, method and system 1100 may train a third AI-model to cluster the first plurality of instances into a third classification including at least one class of the first plurality of classes and at least one class of the second plurality of classes.

Alternatively, or additionally, method and system 1100 may recognize one or more instances of the first plurality of instances according to a class (or classes) of the first plurality of classes, and recognize at least one another instance of the first plurality of instances according to a class of the second plurality of classes.

Method and system 1100 may further synthesize one or more new, artificial, instances according to the instance of the first plurality of instances recognized using the second AI-model. For this matter, such instance may be recognized according to a class of the second classification that is not included in the first classification, and/or recognized with a recognition probability for the class of the second classification being higher than recognition probability of the at least one of instance of the first plurality of instances according to any class of the first classification, and/or where the instance of the first dataset being recognized using the second AI-model is not recognized by the first AI-model.

Method and system 1100 may additionally label the instances of the first plurality of instances recognized using the second AI-model. Such label may reflect a class of the second classification that is not included in the first classification. Alternatively, or additionally, such label may reflect a class of the second classification where the recognition probability is higher than recognition probability of the instance of the first plurality of instances according to any class of the first classification. Alternatively, or additionally, such label may reflect a class where the instance of the first dataset is recognized using the second AI-model and not recognized by the first AI-model.

Method and system 1100 may also select an instance of the first dataset that is not labeled, and perform any of the following actions: Select a class of the second classification that is different from the classes of the first classification according to a characteristic of the instance of the first dataset that is not labeled. Select a class of the second classification that is different from the classes of the first classification according to the number of the instances of the first dataset that are not labeled. And select one or more instances of the class that is different from the classes of the first classification.

It is appreciated that the first dataset and the second dataset may include instances of a type (class) of instances that may be any one of: Customer records of customers of an operator of a communication network. Billing records of customers of an operator of a communication network. Billing items of billing records of customers of an operator of a communication network. And call records of a call-center of an operator of a communication network, the call records relating to at least one of the customer records, the billing records, and the billing items.

Figure 12:
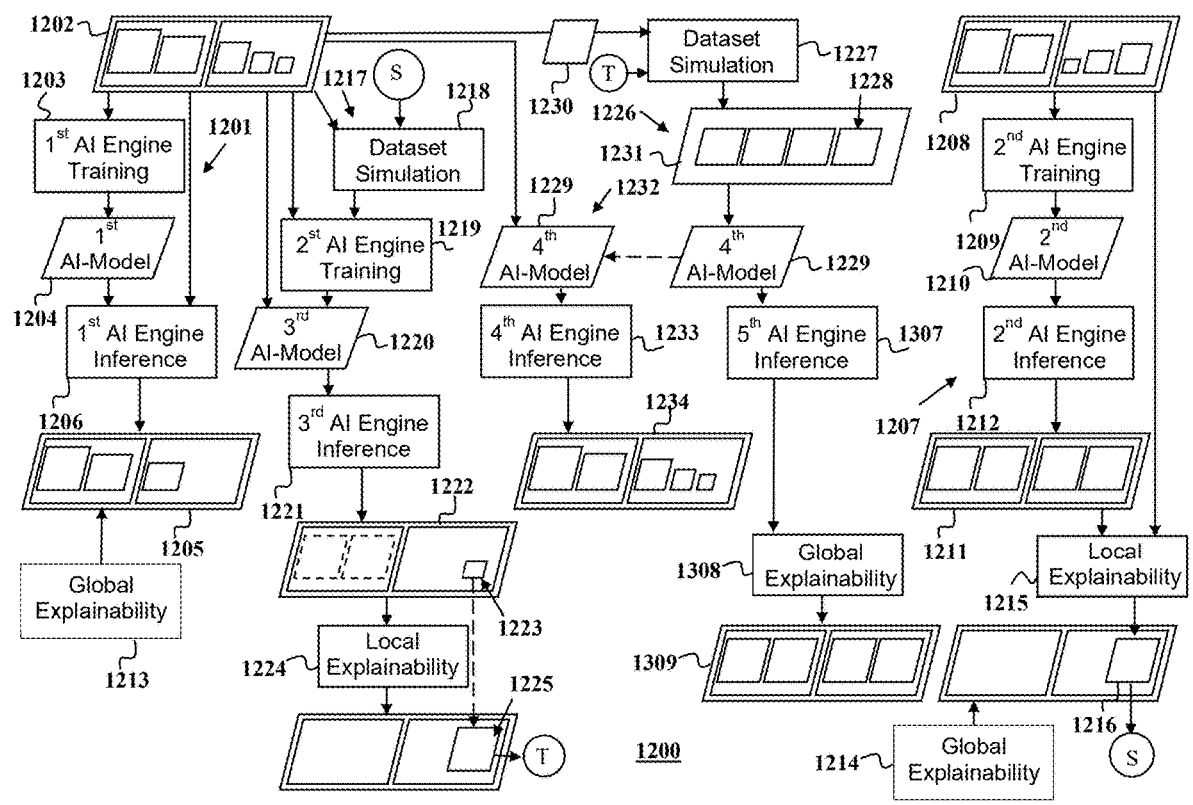
FIG. 12 illustrates a block diagram of a second method and system for determining an outlier data in a dataset, in accordance with one embodiment.

FIG. 12 illustrates a block diagram of a method and system 1200 for determining an outlier data in a dataset, in accordance with one embodiment.

As an option, the method and system 1200 may be implemented in the context of any of the devices and/or servers of any of the devices and/or servers of the network architecture 200 of FIG. 2 and/or the system 300 of FIG. 3, or any of the previous Figures. Of course, the method and system 1200 may be implemented in any desired environment.

Method and system 1200 may include the following five processes:

A first process 1201 using a first dataset 1202 may train (training action 1203) a first AI-model 1204 to determine a first classification 1205 of the first dataset 1202, and/or to recognize at least one record of the first dataset 1202 according to classification 1205 (inference action 1206).

A second process 1207 using a second dataset 1208 may train (training action 1209) a second AI-model 1210 to determine a second classification 1211 of the second dataset 1208, and/or to recognize at least one record of the second dataset 1208 according to classification 1211 (inference action 1212).

Dataset 1202 and dataset 1208 are similar but different. Dataset 1202 and dataset 1208 are similar is the sense that both include records of instances of the same type or structure. For example, both datasets 1202 and 1208 include customer records, or both datasets 1202 and 1208 include billing records, or both datasets 1202 and 1208 include call center records, etc. Dataset 1202 and dataset 1208 are different is the sense that they are collected for different populations. For example, populations of different geographical areas, or populations of different operators, etc.

It is appreciated that there may be any number of datasets such as datasets 1202 and 1208, as well as their respective processes 1201 and 1207.

Processes 1207 may then analyze (perform inferencing) dataset 1208 using AI-model 1210 to classify instances of dataset 1208 into the classes of classification 1211.

A user, or an automatic process not shown in FIG. 12, may compare the classes of classification 1211, or their respective instances, with the classes or the respective instances of classification 1205. It is appreciated that some of the classes (or respective instances) of classification 1211 may have the same or similar characteristics as classes (or instances) of classification 1205. It is also appreciated that some of the classes (or respective instances) of classification 1211 may be substantially different from any class (or instance) of classification 1205.

It is appreciated that global explainability (actions 1213 and 1214) may be used to determine the characteristics of the classes of classification 1205, and to determine the characteristics of the classes of classification 1211, and hence to compare these characteristics to determine a class of classification 1211 that us different from any of the classes of classification 1205.

It is appreciated that the mainstream part of both datasets 1202 and 1208 (or their respective classifications) may include the similar classes, while the different classes may be part of the respective tail parts of datasets 1202 and 1208 (or their respective classifications).

The user, or the automatic process, may then select a class of classification 1211 that is different (no included in, or missing from) classification 1205, or one or more instances of the selected class. It is appreciated that the selected class may be, for example, the largest different class. Namely, that the selected class may have the largest number of instances that are differently classified as compared with the classifications of dataset 1202.

Other conditions for selecting the selected class (or respective instances) are also contemplated. For example, selecting a class of the second classification that is different from the classes of the first classification according to the number of characteristics that are different for any of the classes of the first classification. Such characteristics may be determined and compared, for example, using respective global explainability, such as actions 1213 and 1214. For example, by selecting the class having a larger number of different characteristics.

It may be appreciated that the selected class (or respective instances) may be part of the tail part of dataset 1208 and/or classification 1211. It may be appreciated that the selected class (or respective instances) may also be part of the tail part of dataset 1202, however, the first AI-model 1204 may fail to recognize instances of this selected class because they are too few in its training dataset (e.g., dataset 1202).

The second process 1207 may then continue to action 1215 to process local explainability and produce at least one set of parameters 1216 of at least one instance typical of the selected class of dataset 1208 as classified by the second AI-model 1210. parameter sets are then communicated to a third process 1217 as marked in FIG. 12, by a connector designated with the letter "S".

The third process 1217 may start with action 1218 by synthesizing a plurality of instances that comply with parameters 1216 as received via connector "S". For example, one or more instances of dataset 1202 are selected and modified according to parameters 1216 to produce simulated instances complying with the selected class of parameters 1216.

The third process 1217 may then proceed to action 1219 to train a third AI-model 1220. The third AI-model 1220 may be trained with a combination of dataset 1202 and the instances simulated by action 1218.

The third process 1217 may then proceed to action 1221 ($3^{rd}$ AI inferencing engine) using AI-model 1220, now capable of recognizing instances of the class of parameters 1216, to classify again dataset 1202 and produce classification 1222, now including instances 1223 of dataset 1202 that may comply with parameters 1216.

The third process 1217 may then proceed to action 1224 to perform local explainability on the instances 1223 to produce a set of parameters 1225. The third process 1217 may now transfer parameters 1225 to a fourth process as shown in FIG. 12 by a connector designated by the character "T".

Hence, the second process 1207 may produce one or more sets of parameters of the second AI-model 1210, where each such set of parameters may recognize a class, namely a particular type of instances. Such instances may be included in the tail part of the second dataset 1208. In the example above the parameters are one or more sets of parameters characterizing respective one or more instances that are typical of the selected class of the second dataset 1208. These parameters may be revealed using, according to the example above, local explainability. These parameter sets 1216 are communicated to the third process 1217 via the connector designated by the letter "S".

The third process 1217 then uses the parameters received via connector "S" to synthesize a plurality of instances based on instances of the first dataset 1202, to train a new third AI-model 1220 that may recognize instances of the first dataset 1202 that are similar to the instances of the selected class of the second dataset 1208. Third process 1217 may then reveal the parameters that characterize instances of the first dataset 1202 that are similar to the instances of the selected class of the second dataset 1208 (according to the example above, using local explainability). Third process 1217 may then communicate one or more sets of parameters 1225 of a respective one or more instances the selected class of the first dataset 1202 to a fourth process 1226 via the connector designated by the letter "T".

It is appreciated that parameter sets 1216 characterize instances of the second dataset 1208 while parameters 1225 characterize instances of the first dataset 1202, both typical of the same type of class of instances.

The fourth process 1226 may start with simulation action 1227 by synthesizing a one or more virtual (synthesized) instances conforming to the one or more sets of parameters 1225 received from the third process 1217 via the connector designated by the letter "T".

Simulation action 1227 may synthesize any number of instances 1228 according to parameters 1225. Particularly, simulation action 1227 may synthesize a number of instances according to parameters 1225 that is sufficient to train an AI-model such as a fourth AI-model 1229 to recognize instances of the class, or type, of instances, or data records, characterized by parameters 1225.

To synthesize a data record complying with a particular set of characteristics as determined by local explainability action 1224 and represented by parameters 1225 the simulation action 1227 may obtain from the first dataset 1202 a data record 1230 of a class that is similar to the required parameters 1225, and modify data record 1230 to comply with parameters 1225.

Simulation action 1227 may synthesize any number of classes, or types of instances, or types of data records, represented by a respective plurality of data records such as data records 1228. Altogether, simulation action 1227 may synthesize a fourth dataset 1231.

Dataset 1231 may include only synthesized data records (instances). Alternatively, dataset 1231 may include data records (instances) from the first dataset 1202 that were recognized by the first AI-model 1204, and/or data records (instances) from the first dataset 1202 that were recognized by the third AI-model 1220, augmented with synthesized data records such as data records 1228.

Dataset 1231 may be used to train the fourth AI-model 1229. It is appreciated that for all classes of instances of dataset 1231 there is a sufficient number of instances to train AI-model 1229 to recognize instances of the particular class. In this respect, the fourth AI-model 1229 may recognize all the instances of dataset 1231, and the dataset 1231 may include only instances that the fourth AI-model 1229 may recognize.

Dataset 1231 may therefore differ from dataset 1202 in that dataset 1202 may include unrecognizable instances, while dataset 1231 may include only recognizable instances (by fourth AI-model 1229). The fourth dataset 1231 may be termed herein 'a standard dataset'. Consequently, the fourth AI-model 1229 may be termed a 'standard AI-model', and/or a 'proprietary standard AI-model'.

Namely, the fourth dataset 1231 may include enough number of instances of each type (class) of instances so that the respective AI-model may be trained to recognize. In this respect, the fourth dataset 1231 may not include 'stray instances' that the respective AI-model may not recognize. In other words, the fourth dataset 1231 may not have a typical tail part.

In this respect, the fourth dataset 1231 may be used to label instances of dataset 1202 according to the respective classes of dataset 1231. Hence, instances of dataset 1202 that are not recognized, and/or classified according to dataset 1231 and are thus deemed unlabeled (non-labeled) may be used to determine further classes of the second classification 1211 and/or classification 1222. For example, such class may be selected according to the number of unlabeled instances in the class. For example, by selecting a class having a larger number of unlabeled instances.

A fifth process 1232 may then use the fourth AI-model 1229 ('standard AI-model', and/or 'proprietary standard AI-model') by inferencing action 1233 to recognize (classify) any new version of dataset 1202 and produce classification 1234.

It is appreciated that process 1226, as well as action 1224, may be performed by the moderator business entity. The the moderator business entity may develop a 'standard dataset' (fourth dataset 1231) that is common to all operators, and/or a 'proprietary standard dataset' for each operator.

It is appreciated that dataset 1202, which is the original dataset of a particular operator, is continuously evolving, and thus may always include instances that may not be recognized by the recent 'standard AI-model' (or 'proprietary standard AI-model'). Therefore, process 1200 may be repeated to reveal new classes of instances and add such new classes to the evolving 'standard AI-model' (or 'proprietary standard AI-model').

Figure 13:
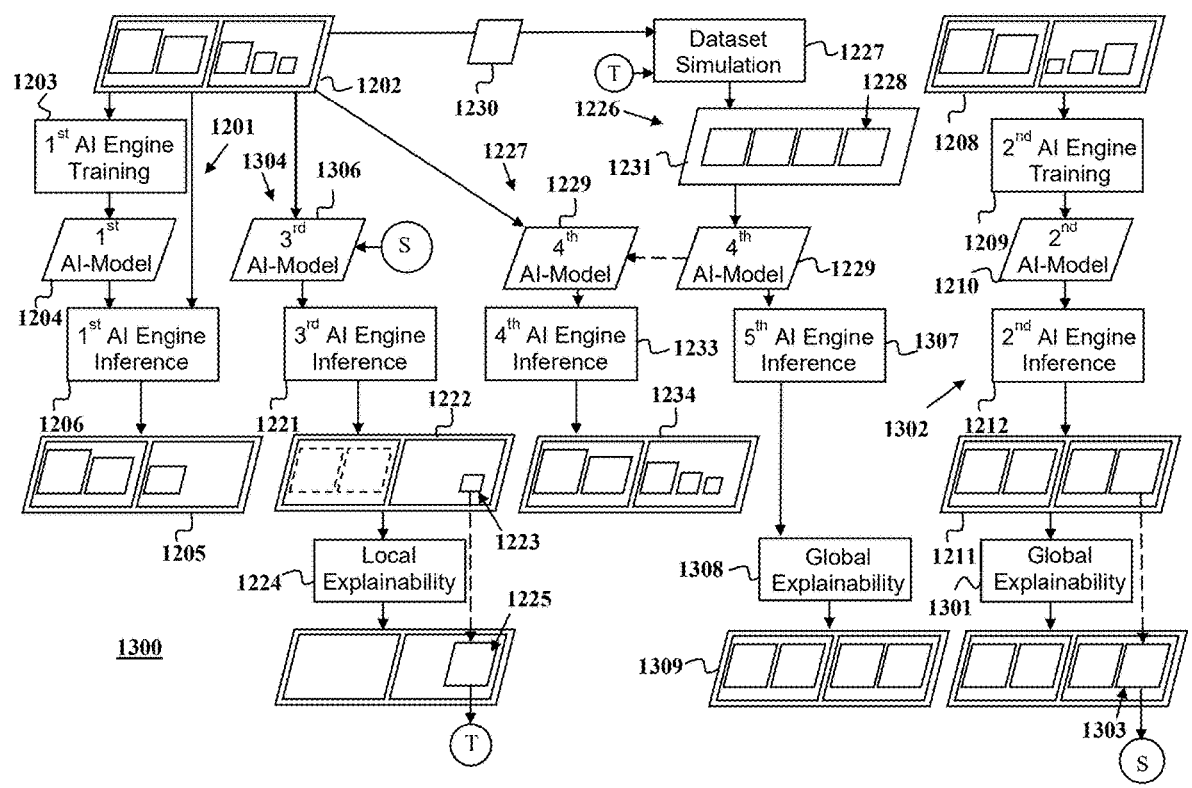
FIG. 13 illustrates a block diagram of a third method and system for determining an outlier data in a dataset, in accordance with one embodiment.

FIG. 13 illustrates a block diagram of a method and system 1300 for determining an outlier data in a dataset, in accordance with one embodiment.

As an option, the method and system 1300 may be implemented in the context of any of the devices and/or servers of any of the devices and/or servers of the network architecture 200 of FIG. 2 and/or the system 300 of FIG. 3, or any of the previous Figures. Of course, the method and system 1300 may be implemented in any desired environment.

Method and system 1300 may include the following five processes. Method and system 1300 may be similar to method and system 1200 of FIG. 12 with respect to the first two processes 1201 and 1207 up to and including reference number 1211 of both FIG. 12 and FIG. 13, and then from reference number 1221 of both FIG. 12 and FIG. 13 until the end of both method and system 1200 and method and system 1300.

As shown in FIG. 13, action 1301 of process 1302 of method and system 1300 of FIG. 13 may differ from action 1213 of method and system 1200 of FIG. 12 in that action 1213 may perform global explainability on classification 1211 to determine a selected class and to determine the parameters (weights) 1303 of the second AI-model 1212 that are useful to recognize instances of the selected class. Process 1302 may then communicate parameters 1303 to a third process 1304 via connector "S". As discussed above, the selected class may be absent from the first classification 1205.

It is appreciated that the description of datasets and AI engines as disclosed above (for example, with reference to dataset 505 and AI engine 509), particularly with respect to the division of the respective distributions into mainstream part and a tail part, as well as the clustering and classification of the respective distributions, may also apply to datasets and AI training engines of FIG. 12 and/or FIG. 13.

It is appreciated that though FIG. 12 and/or FIG. 13 may show or discuss only one instance of class and corresponding parameter sets 1216, and/or parameter sets 1303, any number of such classes and corresponding parameter sets is contemplated.

A reason for communicating a parameter set of a class instead of the entire second AI-model 1210 may be, for example, secrecy. For example, a first operator may refuse to disclose to a second operator the AI-model, as well as the dataset used to create the AI-model (e.g., the second dataset 1208, and the respective second AI-model 1210) but may allow a third party to extract, for example, by using global explainability, some parameter sets associated with the second AI-model 1210.

For this matter, process 1207 may be performed by a first business entity, for example, an operator, while process 1304 may be performed by a second business entity, for example, a moderator.

The third process 1304 may use the one or more parameter sets 1303 received from the second process 1302 via connector "S" to create a third AI-model 1306. The third AI-model 1306 may be a variation of the first AI-model 1204 enhanced with the parameter sets 1303. Alternatively, the third AI-model 1306 may include only the parameter sets 1303.

It is appreciated that the one or more 'parameter sets' 1303 may refer to 'weights' as may be used to tune an AI-model to cluster a particular class (custer) of instances, and/or to recognize, a particular cluster and/or class.

For example, if the second AI model 1210 uses AI method of decision trees, or a similar method, then parameters 1303 may include one or more decisions (or branches, or splits) in a sequence of decisions (or branches, or splits) that may lead to a leaf representing the selected class.

For example, if the second AI model 1210 uses AI method of support vector machine (SVM), then parameters 1303 may include one or more hyper-planes that define the selected class. For example, the hyper-planes closest to the selected one or more instances of the selected class.

For example, if the second AI model 1210 uses AI method of neural network, then parameters 1303 may include a node of the output layer that outputs instances of the selected class.

The third AI-model 1306 is then composed from a base AI-model of the same type (AI technology, AI method) of AI model 1210 being trained using the first dataset 1202, with one output of the base AI-model replaced by parameters 1303.

The third process 1304 may then proceed to inference action 1221 to process the first dataset 1202 usings the third AI-model 1306 to produce a third dataset 1222. The third dataset 1222 may include one or more sets if data records 1223. Each set of data records 1223 is a collection of data records of the first dataset 1202, as recognized (selected) by the inference action 1221 using the third AI-model 1306.

In this respect, the set of data records 1223 may correspond to new classes of data records of the tail part of the first dataset 1202, corresponding to classes of data records of the tail part of the second dataset 1208, according to classification 1222.

The third process 1304 may then proceed to action 1224 to process local explainability of data records 1222 to produce particular characteristics 1225 of the respective new class of the first dataset 1202. These characteristics 1225 of the data records 1223 are then communicated to fourth process 1226 via the connector designated by the letter "T". At this point method and system 1300 coincides with method and system 1200 as described above with reference to FIG. 12.

It is appreciated that though FIG. 12 and/or FIG. 13 may show only one instance of data records 1223, any number of such class of data records is contemplated. It is appreciated that though FIG. 12 and/or FIG. 13 may only one instance of characteristics 1225 of data records 1223, any number of such characteristics 1225 is contemplated.

It is appreciated that inference action 1221 may produce a small number of data records 1223 representing instances of the population of the tail part of the first dataset 1202. It is assumed that even when properly labeled, this number of instances may be too small for the training action 1203 to create an AI-model 1204 that can detect such instances with sufficient accuracy (such as low false positive and low false negative values). Hence there is a need to generate a larger number of instances of the respective class.

Simulation action 1227 may synthesize any number of classes, or types, of instances, or data records, represented by a respective plurality of data records such as data records 1223.

Practically speaking, the fourth AI-model 1229 combines the recognition capabilities of both the first AI-model 1204 and the second AI-model 1210. However, the capabilities of the second AI-model 1210 are adapted to the characteristic of the first dataset 1202 by using the selected data records 1223 in the simulation action 1227.

Hence, method and system 1200, and/or 1300, may have two inputs: the first dataset 1202 and the second dataset 1208, and an output in the form of the fifth dataset 1234. Method and system 1200 may be executed by a single business entity, or by two business entities, or by three business entities. For example, the first and the second business entities may be two operators (or more) and the third business entity may be a moderator business entity.

When executed by two business entities the first business entity may execute processes 1201, 1217 (or 1304), 1226, and 1232, while the second business entity may execute process 1207 (or 1302). When executed by three business entities a mediating third party may execute process 1226 and optionally also process 1217 (or 1304).

It is appreciated that two business entities (e.g., operators) may employ the method and system 1200, and/or 1300, in both directions, where in each direction another of the two business entities performs as the first business entity.

It is appreciated that the first business entity (e.g., operator) may use the method and system 1200, and/or 1300, with any number of second business entities, practically independently of each other second business entity.

It is appreciated that the third party, or mediating, business entity may use the method and system 1200, and/or 1300, with any number of first and second business entities (e.g., operators). In this respect, the third party, or mediating, business entity may develop and maintain a common, or standard synthesized dataset such as dataset 1231.

The common dataset may be fully synthesized, namely include no data record from any of the input datasets (datasets 1202 and 1208). The common dataset may have a number of instances (data records) of each class that is sufficient to train an AI-model to recognize an instant of the respective class with sufficient accuracy. The third party may also maintain, for each business entity (e.g., operator), a 'proprietary standard' dataset (such as dataset 1231) that does not include classes of no interest for the particular business entity.

It is appreciated that it may be sufficient for the common dataset, as well as the proprietary standard dataset of each business entity, to include only classes of the tail parts of the various business entities. In such case each business entity, when producing a new AI-model (such as in process 1201) may add the common dataset, or the respective proprietary standard dataset, to the current dataset (e.g., dataset 1202).

It is appreciated that a particular dataset may include a plurality of instances. The dataset may have a plurality of parameters. Typically, each instance may have a particular plurality of parameters of the general plurality of parameters. The dataset may have a typical distribution of instances, according to their respective parameters. Some parameters, or parameter values, may be represented in a relatively larger plurality of instances (e.g., mainstream instances), while other parameters may be represented in a relatively smaller plurality of instances (e.g., tail instances).

An AI system is trained to determine an instance according to a characteristic according to one or more parameter values, of the particular plurality of parameters of the instance, of the general plurality of parameters. An AI system can be trained to determine such instance if the respective characteristics is represented in a number of instances that is large enough to train the AI system. Therefore, tail instances, which number is too small to train the AI system, will not be detected by the AI system.

For example, the system and method described above may recognize a particular customer that is likely to call the call-center. Namely, that the probability that the particular customer will call the call-center during a particular period is higher than a predefined threshold. It is appreciated that one or more particular types (classes) of customers are more likely than others to call the call center.

In a different example, the system and method described above may recognize a particular bill, and/or billing item, that is likely to be a reason for calling the call-center. In a different example, the system and method described above may recognize a pair of a particular customer and a particular bill, and/or billing item, that together may evolve into a call to the call-center. Customers, bills, billing items, etc., have parameters of various values where a particular combination of parameter values may indicate the probability of a call to the call-center (or any other respective action or event).

The ability of the system and method described above to recognize such instances, or a combination of instances, rely on the ability to train an AI system, which rely on the number of instances, or combination of instances, of the particularly characteristic, in the training dataset. Hence, tail instances may fail to train the AI system to detect such tail instances.

To enable the AI system to be trained to detect tail instances the above system and method increases the number of tail instances by synthesizing 'virtual' tail instances. The problem is that there are too many types of tail instances, where a type (class) is defined as a particular combination of parameters (of the general plurality of parameters) and a respective value range for each parameter.

The system and method described above uses an AI-model that was trained using a second dataset, to recognize 'outlier' tail instances in a first dataset. Obviously, the first and the second datasets are similar in their population (customers, bills, billing items, call-center incidents, etc.) having a different distribution of the population (namely different distribution of parameter values), at least in the tail part. If the AI-model trained for the second dataset recognizes 'outlier' tail instances in the first dataset than such tail instances are synthesized. Other methods for determining what type of tail instances to synthesize are also contemplated.

At this point it is immaterial if the AI-model is used, or a parameter set representing the AI model, or a parameter set representing a particular class of instances that the AI model is trained to detect, as may be determined, for example, by processing global explainability on the output of the AI-model.

To synthesize a class of tail instances, the relevant characteristics are determined, for example, by processing local explainability on the tail instances (of the first dataset) that were recognized by the AI-model trained by the second dataset.

The 'tail instances relevant characteristics' (of the class of tail instances to be synthesized) may then be 'implanted' in a plurality of instances of the mainstream part (of the first dataset) that are relatively similar to the tail instances (of the first dataset) that were recognized by the AI-model (trained by the second dataset).

Returning to FIG. 4 and/or FIG. 5, it is assumed that the respective method and systems 400 and/or 500 by preempting and/or avoiding the reason for a call to the call-center, practically affect the distribution of the respective plurality of instances, at least with respect to bills and billing items, but also with respect to some customer parameters, or parameter values. For example, if method and systems 400 and/or 500 is sufficiently effective, it may cause a drift of instances from the mainstream part to the tail part.

Returning to the evolving datasets of FIG. 6, and/or FIG. 7, and/or FIG. 8, it is assumed that in the subsequent datasets (namely respective datasets indicated with the characters "B", "C", "D", etc.) the instance of the mainstream part may change (e.g., drift to the tail part). Hence, AI models trained by later datasets may fail to detect classes of the mainstream part of the earlier datasets that has drifted into the tail part of latter datasets. The system and method 900 of FIG. 9, and/or the system and method 1000 of FIG. 10, may be used to recognize such drifting classes of instances.

As the characteristics of the mainstream instances change in time, the population of a previously mainstream class may reduce, and the class may drift to the tail part. The drifting class may then divide into two sub-classes. A first sub-class may still be recognized by an earlier AI-model (trained by an earlier dataset), while the second sub-class may include instances of the drifting class that earlier AI-models fail to recognize (as their characteristics, such as parameter values, have changed).

Returning to the system and method 1100 of FIG. 11, and/or the system and method 1200 of FIG. 12, the earlier datasets of FIG. 6, and/or FIG. 7, and/or FIG. 8 may be used as the respective second dataset 1109 of FIG. 11, and/or second dataset 1208 of FIG. 12. Alternatively, the respective AI-modules 510 and/or 519, may be used as data-models 1114 and/or 1210.

As disclosed above, an earlier AI-model may be used to recognize instances of a drifting class in a latter dataset. However, some instances of the drifting class may not be recognized by the earlier AI-model (hence becoming 'lost instances'). For example instances of the second sub-class of the drifting class.

To recognize such lost instances a new AI-model may be trained using synthesized instances such as with processes 1226 and/or 1227 of FIG. 12 and/or FIG. 13. The new AI-model may be trained using instances synthesized by implanting characteristics of the first sub-class in instances of similar classes of the latter (most recent) dataset. The implanted characteristics may be recognized by earlier AI-model, and optionally determined by local explainability.

To this point, as all the evolving datasets and their respective AI-models are of the same business entity (e.g., operator) the process may be performed entirely within the same single business entity.

However, there may always be instances of the tail part that are not classified, and/or not recognized, and/or inappropriately recognized. For example, customers, and/or bills, and/or billing items that eventually are associated with a call to the call-center, but are not properly anticipated to cause a call to the call-center. To train the AI-model to properly recognize such instances it may be necessary to use external datasets, and/or AI-models, and or parameters associated with explainability of a respective foreign AI-model, etc. Hence returning to the multi-party system and method 1100 and 1200 of FIGS. 11 and 12 (or FIGS. 11 and 13), with or without a mederator business entity.

In this respect, a mederator business entity may maintain a standard synthesized dataset such as dataset 1231. Optionally, for example, a mederator business entity may also maintain for each business entity, one or more proprietary standard dataset, similar to dataset 1231 but derived from the respective proprietary dataset 1202.

As shown in FIG. 12, and/or FIG. 13, a fifth AI inference action 1307 together with global explainability action 1308 may produce a classification 1309 of the standard dataset 1231, and/or the respective proprietary standard datasets.

Figure 14:
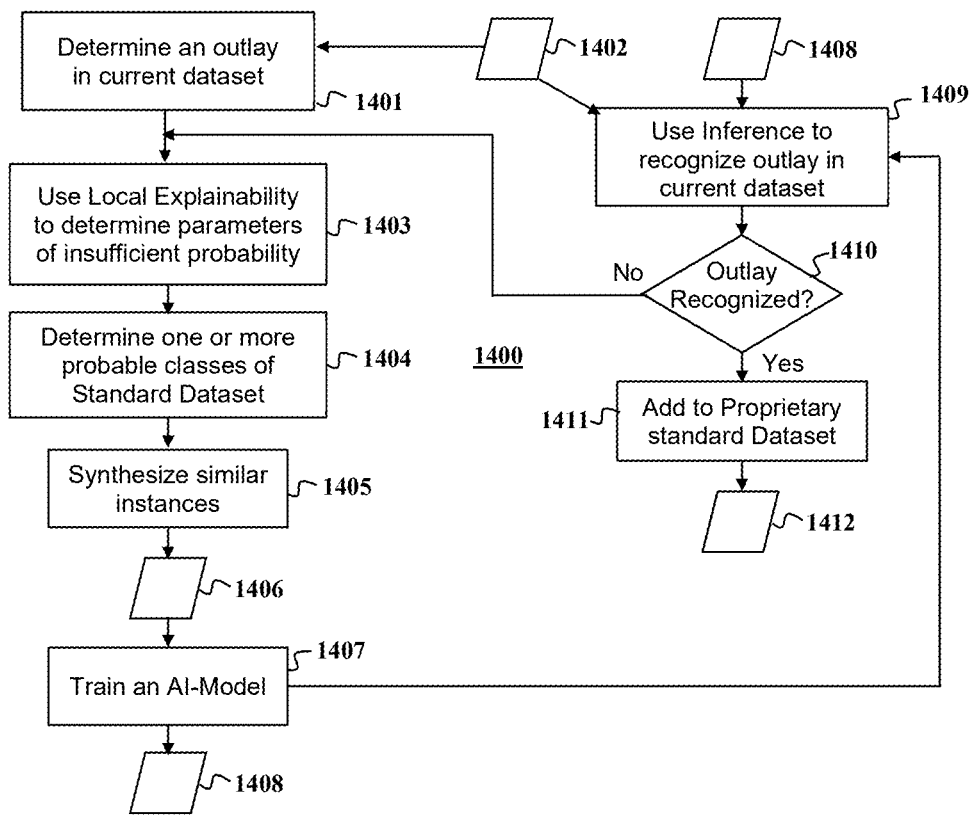
FIG. 14 illustrates a flow chart of a process for selecting parameters of a standard dataset class to recognize an outlier of a dataset, in accordance with one embodiment.

FIG. 14 illustrates a flow chart of a process 1400 for selecting parameters of a standard dataset class to recognize an outlier of a dataset, in accordance with one embodiment.

As an option, process 1400 may be implemented in the context of any of the devices and/or servers of any of the devices and/or servers of the network architecture 200 of FIG. 2 and/or the system 300 of FIG. 3, or any of the previous Figures. Of course, process 1400 may be implemented in any desired environment.

Process 1400 may start with action 1401 by determining, or selecting, at least one outlay instance in the current dataset 1402. An outlay instance is a data record of the current dataset 1402 that is not identified by the current AI-model. The current dataset may be, for example, the first dataset 1202 of FIG. 12, and/or FIG. 13, and the current AI-model may be the first AI-model 1204 of FIG. 12, and/or FIG. 13.

In this regard, the current AI-model may not have an appropriate class that the outlay instance may be associated with. Or, alternatively, the recognition probability of the outlay instance by the current AI-model is too low (e.g., below a predefined probability threshold).

It is appreciated that such outlay instance may be an instance of the tail of the population of instances of the current dataset. In other words, action 1401 may select one or more instances of the current dataset that the current AI-model has rejected.

Process 1400 may proceed to action 1403 to determine one or more parameters of each outlay instance. The parameters may be determined, or selected, according to their respective contribution to the rejection of the particular outlay instance by the current dataset.

AI-model. For example, action 1403 may use local explainability to determine a parameter of the current AI-model that is most influential regarding the lack of recognition of the particular outlay instance. For example, action 1403 may analyze the sensitivity of the recognition probability to selected parameters of the current AI model and select one or more parameters to which the value of the recognition probability of the particular outlay instance is most sensitive.

Process 1400 may then proceed to action 1404 to determine one or more classes of the standard dataset that may be associated with the particular outlay instance. For example, action 1404 may select a class of the classification of the standard dataset (or proprietary standard dataset) according to the one or more parameters of the outlay instance selected in action 1403.

For example, the standard dataset may be dataset 1229 of FIG. 12, and/or FIG. 13, and that its classification may be classification 1309 of FIG. 12, and/or FIG. 13.

Process 1400 may then proceed to action 1405 to synthesize a plurality of virtual instances 1406, based on the parameters of the outlay instances, and/or based on the parameters of the selected class of the standard dataset, or a combination thereof.

Process 1400 may then proceed to training action 1407 to train a new AI-model 1408, using the plurality of instances created in action 1405.

Process 1400 may then proceed to inference action 1409 to recognize the outlay instance in the current dataset 1402. If the outlay instance is recognized (action 1410) then process 1400 may add (action 1411) the selected plurality of virtual instances 1406 to the proprietary standard dataset 1412. If the outlay instance is not recognized in action 1410, then actions 1403, 1404, 1405, 1407, and 1409 may be repeated, using different parameters (action 1403) and/or a different class (action 1404) to train and test a different AI-model 1408.

It is appreciated that process 1400 may generate any number of different pluralities 1406 of virtual instances and respective AI-models 1408, and select one of them according to a criterion.

Such criterion may be, for example, the number of instances recognized in action 1409, or the probability of the recognition of the outlay instance, or any similar evaluation formula, for example, combining the above. For example, such combination may include the expectancy of recognition, and/or the average probability of recognition, of the plurality of outlay instances of the first database recognized by the second AI-model.

Figure 15:
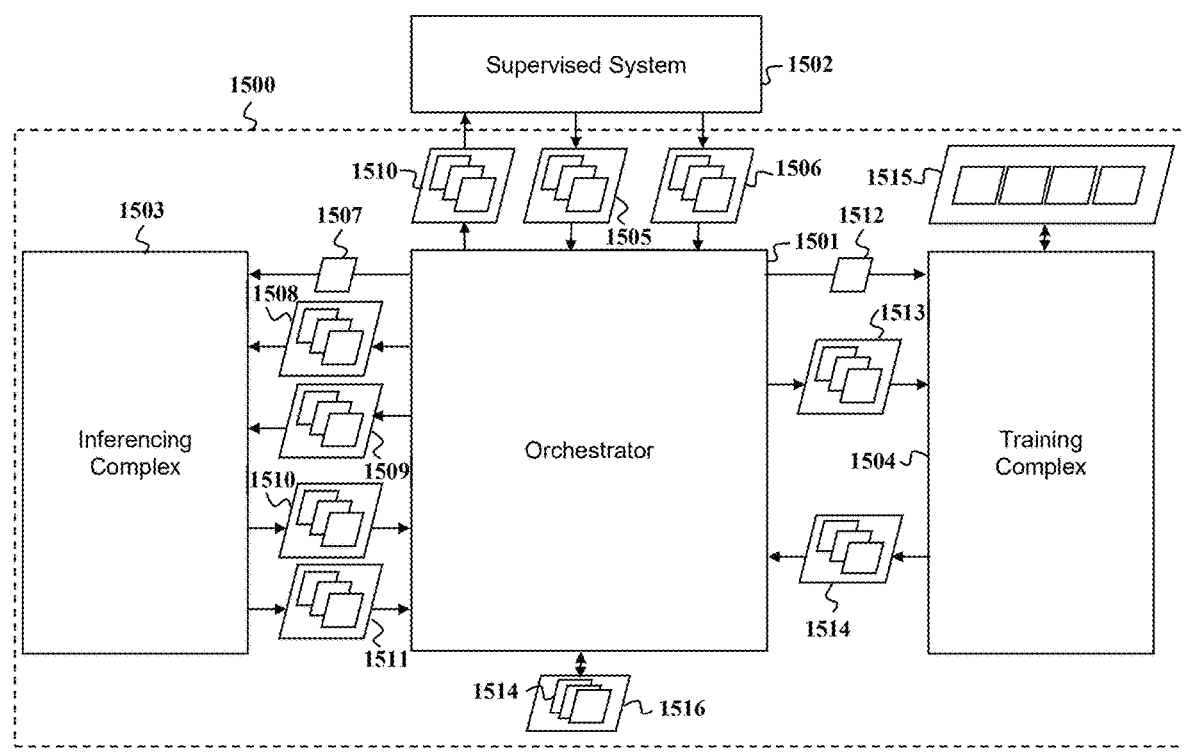
FIG. 15 illustrates a block diagram of a complex AI system including an orchestration system, in accordance with one embodiment.

FIG. 15 illustrates a block diagram of a complex AI system 1500 including an orchestration system 1501, in accordance with one embodiment.

As an option, complex AI system 1500 may be implemented in the context of any of the devices and/or servers of any of the devices and/or servers of the network architecture 200 of FIG. 2 and/or the system 300 of FIG. 3, or any of the previous Figures. Of course, complex AI system 1500 may be implemented in any desired environment.

As shown in FIG. 15, complex AI system 1500 may include orchestration system 1501 that may be supervising an inferencing complex 1503, and may be additionally supervising a training complex 1504. Therefore, complex AI system 1500, and particularly orchestration system 1501, may be communicatively coupled with supervised system 1502 for example to exchange data.

Orchestration system 1501 may also be communicatively coupled with inferencing complex 1503, for example to communicate instructions and/or exchange data such as AI models. Orchestration system 1501 may also be communicatively coupled with training complex 1504, for example to communicate instructions and/or exchange data such as AI models.

As shown in FIG. 15, all data is communicated via orchestration system 1501. However, it is contemplated that data received from supervised system 1502 may be communicated directly to inferencing complex 1503 for analysis, and/or to training complex 1504 for training new AI-models. It is contemplated that data such as analysis result received from inferencing complex 1503 may be communicated directly to supervised system 1502.

In one embodiment, a purpose of AI system 1500 may be to modify and/or optimize the operation of a supervised system 1502. The supervised system 1502 may be any system. For example, supervised system 1502 may be a communication network, and/or a particular service of a communication network, and/or a billing system of a communication network, and/or a call-center of a communication network. For example, supervised system 1502 may be a system such as the billing system and/or call-center discussed with reference to any of the previous Figures, etc.

In one embodiment, a purpose of AI system 1500 may be to modify and/or optimize the operation of AI system 1500 itself, for example by modifying and/or optimizing the operation of inferencing complex 1503 and/or training complex 1504.

The term 'optimization' may refer, for example, to a situation, where there may be two measurable requirements of some opposing nature. For example, a time related requirement and a cost related requirement, where, for example, it is possible to reduce time, such as processing time, however increasing cost, and/or to reduce cost, such as processing cost, however by increasing processing time. Therefore, the optimization mechanism may have a function having a maximum or a minimum and the optimization process may seek such required maximum or a minimum or a related value. It is appreciated that the term 'cost' may also refer to any type of revenue as well as lost potential revenues. It is appreciated that the process of optimization may involve any number of measurable requirements.

In this respect, AI system 1500 may have a 'supervision purpose' that may be a measurable value. For example, the purpose of AI system 1500 may be to reduce the load on the call-center, as discussed above. It is appreciated that any type of supervised system is contemplated, as well as any type of supervision purpose. As shown in FIG. 15, AI system 1500 may include an orchestration system 1501, an inferencing complex 1503, and a training complex 1504.

The term 'sufficiency' may refer to any measure, or value, that is external to AI system 1500, and may represents a measure, or an evaluation value, of a particular purpose of operating AI system 1500, such as the supervision purpose, for example, as described above.

For example, supervised system 1502 may execute process 400 of FIG. 4 and the purpose of process 400 may be to reduce the number of calls to the call-center. In such case, AI system 1500 may be deemed sufficient if the number of calls to the call-center is below a predefined threshold, or reducing, etc. Consequently, AI system 1500 may be deemed insufficient if the number of calls to the call-center is above the predefined threshold, or if the instantaneous growth of the number of calls to the call-center is above the predefined threshold.

The terms, 'deadline', and/or 'time limit', and/or 'time constraint', and/or 'time requirement', may refer to a value limiting the time for executing the processes of AI system 1500 to meet the associated purpose. Such deadline, or time constraint, etc., may be associated with the operation of supervised system 1502. For example, if supervised system 1502 executes process 400 of FIG. 4, such deadline may be the time of issuing the bills to the customers. Such deadline may be an absolute value of time, while the time limit may refer to a relative value representing the time remaining until the deadline, or an interim time. It is appreciated that there may be several deadlines associated with the operation of supervised system 1502 and/or AI system 1500.

Inferencing complex 1503 is complex in the sense that it may include a plurality of AI inferencing engines. Some AI inference engines may execute the same AI-model to increase the concurrent processing power. Some AI inference engines may execute different AI-models, such as the AI-model 510 and the AI-model 519 of FIG. 5, and/or FIG. 9, and/or FIG. 10. Some AI inference engines may execute alternative AI-models, such as AI-models 510A, 510B, and 510C of FIG. 9. Some AI inference engines may execute different AI-models of the same type, such as AI-models 1105 and 1112 of FIG. 11, and/or AI-models 1204, 1210, 1218, and 1231 of FIG. 12, and/or AI-models 1204, 1210, 1306, and 1227 of FIG. 13.

AI system 1500 may be continuous in the sense that, at any time, orchestration system 1501 may change the number of inference engines operating concurrently. Orchestration system 1501 may change the AI-models used by each of the inference engines. Orchestration system 1501 may change the flow of data between the inference engines of AI system 1500.

AI system 1500 may be continuous also in the sense that, at any time, orchestration system 1501 may create a training dataset, invoke training of a new AI model, and update one or more inference engines with the new AI model without stopping the flow of data through AI system 1500. Additionally, orchestration system 1501 may measure and evaluate the 'sufficiency' of AI system 1500 continuously to determine the required changes to the structure and operation of AI system 1500.

Orchestration system 1501 may then make appropriate changes to the structure and operation of AI system 1500 to return to sufficiency, for example, by changing the structure of inferencing complex 1503, and or by controlling training complex 1504, for example, by producing more AI-models for inferencing complex 1503.

In this respect, the term 'cost of insufficiency' may refer to the monetary value of the cost of missing the purpose of the AI system 1500. For example, the cost of operating the call center of to handle customer calls beyond the goal set by the threshold value discussed above. The cost of insufficiency may be further adjusted, for example, with the cost of operating AI system 1500 to reduce the number of calls to the call-center below the threshold, for example, by adding processing power to execute more inferencing processes, or training processes, etc.

Additionally, and/or alternatively, AI system 1500, and/or orchestration system 1501, may consider the cost of operating inferencing complex 1503, and/or training complex 1504. It is appreciated that operating an inferencing engine has a cost such as processing cost. It is appreciated that such processing cost of an inferencing engine may depend on the particular AI-model used, as well as on the size of the dataset processed. It is appreciated that operating a training engine to produce an AI-model has a cost such as processing cost. It is appreciated that such processing cost of a training engine may depend on the size of the dataset used to train an AI-model, as well as the complexity of the AI-model being trained.

It is appreciated that AI system 1500, and/or orchestration system 1501, when processing optimization, may consider time requirements, and/or cost of operating the AI system 1500, and/or the cost of insufficiency of supervised system 1502, and/or various combinations thereof, etc.

It is appreciated that the orchestration system 1501 may therefore measure, and/or compute and/or evaluate, continuously, and/or repeatedly, the sufficiency of AI system 1500, optionally including the expected sufficiency of supervised system 1502.

Orchestration system 1501 may therefore measure, and/or compute and/or evaluate, continuously, and/or repeatedly, the cost of insufficiency, optionally including the expected cost of insufficiency of supervised system 1502.

Orchestration system 1501 may therefore also measure, and/or compute and/or evaluate, continuously, and/or repeatedly, the time constraints, associated with the operation of AI system 1500, and/or supervised system 1502.

Orchestration system 1501 may then determine the optimal structure and operation of AI system 1500. Particularly, the optimal structure and operation of inferencing complex 1503, and/or training complex 1504. In this respect, for example, orchestration system 1501 may then determine how many inferencing engines to operate, which AI-models to use, and how various inferencing engines should be connected to achieve a desired result considering, for example, an optimized time-and-cost consideration with reference to deadlines and cost considerations as described above.

As shown in FIG. 15, AI system 1500 may receive from supervised system 1502, an input 1505, which may include any number of datasets, such as for example, datasets 504 and 515 of FIG. 5. AI system 1500 may receive from the supervised system 1502, an input 1506, which may include supervisory parameters such as measures of sufficiency, or insufficiency, values of various time constraints, costing parameters, etc. It is appreciated that input 1506 may be received from supervised system 1502 automatically, or may be entered manually, for example, by a user (administrator).

As shown in FIG. 15, orchestration system 1501 may communicate to inferencing complex 1503 instructions 1507, AI-models 1508, and data-streams 1509, and receive from inferencing complex 1503 recognized instances 1510, and unrecognized instances 1511.

As an example, supervised system 1502 may be a billing system for billing customers of an operator of a communication network for services rendered to the customers, and/or a call-center receiving calls from customers of an operator of a communication network, for example, call associated with bills issued to the customers. Such supervised system 1502 is discussed above with reference to FIGS. 4 to 14.

The purpose of AI system 1500, and/or orchestration system 1501, may be, for example, to reduce the cost of operating the call-center. For example by eliminating the reason for a customer to call the call center. For example by determining the reason for a customer to call the call center, and/or by suggesting (to the billing system) a resolution for the customer's need to call the call center.

As discussed above, AI system 1500 may have to recognize, or detect, or determine, particular customers (for example via their respective customer records), as well as billing items (for example via respective customer billing records). Such analysis of customer records data, and customer billing data, and associating a particular problem with a particular pair of customer and billing item with a particular problem may be based, for example, on history of calls to the call-center.

As discussed above, AI system 1500 may have to further recognize, or detect, or determine, particular resolutions, where each such resolution may be applicable to a particular problem associated with a particular pair of customer and billing item. Such analysis may be based, for example, on history of calls to the call-center.

It is therefore appreciated that, for the example of the supervised system 1502 discussed herein involving the call-center, orchestration system 1501 may have to train training complex 1504 to create one or more AI-models that can recognize, or detect, or determine, any of particular customers, billing items, pairs of customers and billing items, problems associated with respective pairs of customers and billing items, as well as resolutions associated with problems associated with respective pairs of customers and billing items.

It is therefore appreciated that, AI system 1500, and/or orchestration system 1501, may need to operate training complex 1504 inferencing complex 1503 within restrictions such as time and cost requirements as discussed above, to optimize the sufficiency of supervised system 1502.

In this regard, input datasets 1505, that that may be communicated by supervised system 1502 to AI system 1500, may refer to any one of customer records, billing records (for example received from a billing system), customer call records and customer resolution records (for example received from a call-center), etc., as well as combinations thereof. For example, such input datasets 1505 may include data such as datasets 402 and 413 of FIG. 4, and/or dataset 505, and/or dataset 517 (call-center incident records), and/or dataset 526 of FIG. 5.

In this regard, output datasets 1510 that may be communicated by AI system 1500 to supervised system 1502, may refer to dataset 531 of FIG. 5 and/or FIG. 10, and/or output 903 of FIG. 9. It is appreciated that in the example of the billing system and call-center the output datasets 1510 may enable the supervised system 1502, such as the billing system, to eliminate customer calls to the call-center, by resolving problems associated for example with particular pairs of customer and billing item.

As shown in FIG. 15, orchestration system 1501 may communicate to training complex 1504 instructions 1512, and/or meta-training datasets 1513, and receive from training complex 1504 AI-models 1514. Training complex 1504 may also have access to a database of one or more standard datasets 1515, such as standard dataset 1229 of FIG. 12. Orchestration system 1501 may communicate to training complex 1504 instructions 1512, and/or meta-training data 1513, instructing training complex 1504 to select particular classes from standard datasets 1515 to generate a respective AI-model 1514.

Orchestration system 1501 may store such AI-models 1514 in a repository and/or database 1516 of AI-models 1514 for future use in inferencing complex 1503. Repository and/or database 1516 may include, for each of such AI-model 1514, a value representing the cost of the training of the particular AI-model 1514.

Repository and/or database 1516 may also include, for each of such AI-model 1514, a value representing the cost of executing the particular AI-model 1514. Such cost of executing the particular AI-model 1514 may be represented as the cost of executing the particular AI-model 1514 to inference and/or recognize, one or more instances. For example, the cost of inferencing and/or recognizing an input dataset including one thousand instances or any similar standard number of instances. The cost of training, and/or the cost of executing, a particular AI-model 1514 may include the cost of the required processing power, the cost of run-time memory, etc. Such cost values may be measured, and/or evaluated, by orchestration system 1501, when operating such AI-model 1514 within inferencing complex 1503.

Repository and/or database 1516 may also include, for each of such AI-model 1514, a value representing the time for executing the particular AI-model 1514 to inference and/or recognize, one or more instances. For example, the time to inference and/or recognize an input dataset including one thousand instances or any similar standard number of instances. Such time values may be measured, and/or evaluated, by orchestration system 1501, when operating such AI-model 1514 within inferencing complex 1503.

Figure 16:
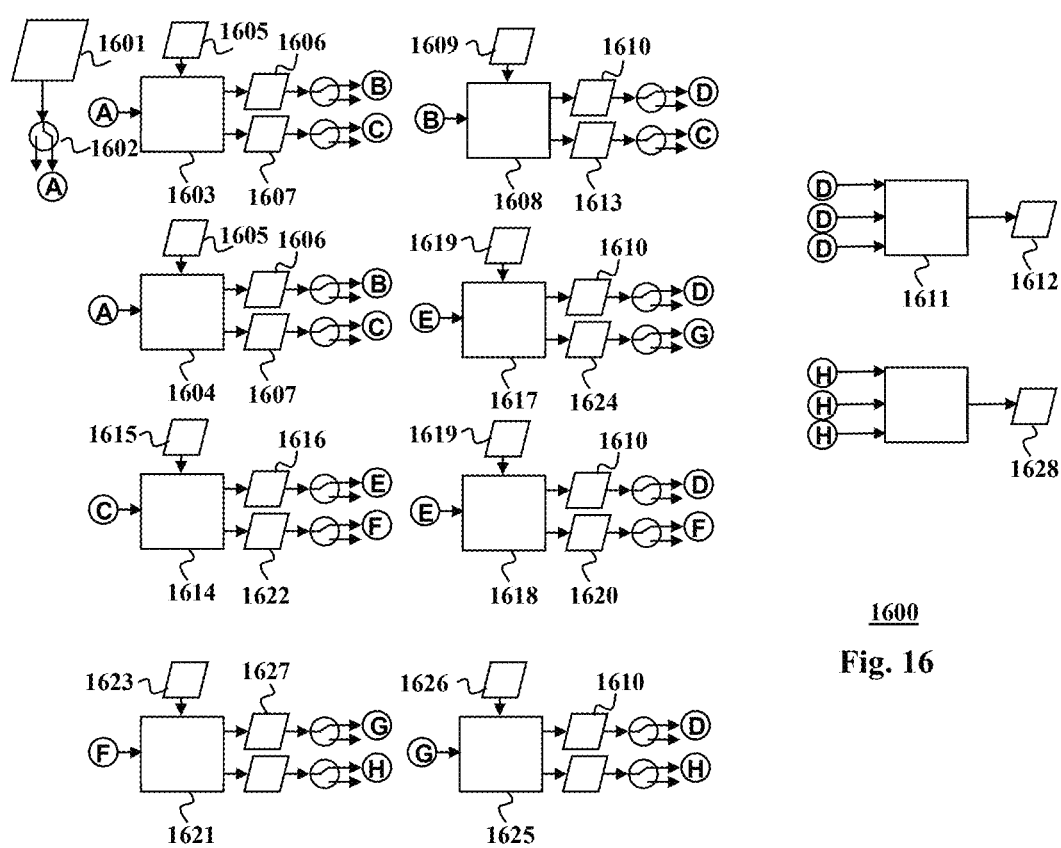
FIG. 16 illustrates an example of an arrangement of inferencing engines within the inferencing complex, and the flow of data between the inferencing engines, in accordance with one embodiment.

FIG. 16 illustrates an example of an arrangement 1600 of the flow of data between inferencing engines of inferencing complex 1503 of the complex AI system 1500 of FIG. 15, in accordance with one embodiment.

As an option, arrangement 1600 of FIG. 16 may be implemented in the context of any of the devices and/or servers of any of the devices and/or servers of the network architecture 200 of FIG. 2 and/or the system 300 of FIG. 3, or any of the previous Figures. Of course, arrangement 1600 may be implemented in any desired environment.

Arrangement 1600 may be arranged by orchestration system 1501 of complex AI system 1500 of FIG. 15, for example, according to input 1506 of FIG. 15. Input 1506 may include various supervisory parameters such as measures of sufficiency, or insufficiency, values of various time constraints, costing parameters, including cost of insufficiency and/or cost of processing, etc.

In this respect, orchestration system 1501 may create arrangement 1600 to accomplish the purpose of AI system 1500, such as to optimize the operation of AI system 1500 and/or supervised system 1502 within the constraints provided by Input 1506.

It is therefore appreciated that arrangement 1600 is an example of inferencing complex 1503 arranged by orchestration system 1501 to optimized the operation of AI system 1500 and/or supervised system 1502 within the constraints provided by Input 1506. Orchestration system 1501 may achieve such optimization, for example, by processing input datasets 1505, within the time constraint provided by input 1506, and, considering the cost of processing, the cost of the eliminated calls to the call-center, as well as the cost of eliminating the calls to the call-center.

It is therefore appreciated that arrangement 1600 may be one of several possible arrangements of inferencing complex 1503, as selected by orchestration system 1501, as a possible arrangement to achieve optimized operation of for the set of requirements of inferencing complex 1503, according to input 1506 of FIG. 15. Arrangement 1600 may represent a particular selection of inferencing engines executing a respective selection of AI-models 1514 provided by training complex 1504 to achieve the optimized operation.

Orchestration system 1501 may achieve such optimization, for example, by initiating particular inferencing engines, allocating a particular AI-model to each of the inferencing engines, and determining the flow of data to each of the various inferencing engines and respective AI-models, as well as the flow of data between the various inferencing engines and respective AI-models. The particular selection of inferencing engines, respective AI-models, and respective data flow is determined to achieve the optimization goal considering, for example, time requirements and cost requirements as described above.

In FIG. 16, dataset 1601 may be the data to be processed by arrangement 1600, and may be equivalent to input datasets 1505 of FIG. 15. As shown in FIG. 16, according to arrangement 1600, orchestration system 1501 may have directed dataset 1601 via switch 1602 and connector "A" to inferencing engines 1603 and 1604.

In FIG. 16, the symbol of switch 1602 and the associated connector serve to represent a decision of orchestration system 1501, directing the flow of data between various inferencing engines. In FIG. 16, the symbol of switch 1602 has only two possible options of which one is designated as a selected connector. However, it is appreciated that switch 1602 may have any number of options and designated connectors. This may also apply to other elements of FIG. 16 having the same shape of switch 1602 and associated connectors.

In this respect, orchestration system 1501 may initiate an instance of an inferencing engine, determine the AI-model to be used by the particular inferencing engine, determine where from to receive one or more inputs to the particular inferencing engine, and determine where to communicate any of one or more outputs of the particular inferencing engine. Obviously, orchestration system 1501 may cancel the operation of any inferencing engine, and/or change the data-flow, as needed.

In the example of FIG. 16, and/or arrangement 1600, each data element (e.g., record, and/or instance) of dataset 1601 may stand on its own. Namely, the order of the data elements of dataset 1601 is immaterial to the processing by any of the inference engines. In other words, for example, the inferencing engines may not make a decision based on any particular sequence of data elements of dataset 1601.

For example, dataset 1601 may include customer records, and/or customer's bills. The order of customer records, and/or the order of customer's bills, in dataset 1601, may not determine whether a pair of customer and bill is problematic or not. Consequently, order of customer records, and/or bills may not determine and/or may form a reason for the customer to call the call-center. Similarly, the order of customer records, and/or the order of customer's bills, and/or the order of call-center instances, may not determine a possible resolution to the problematic pair of customer and bill.

Therefore, in the example of arrangement 1600, orchestration system 1501 may determine the flow of data between various inferencing engines for each data element independently of other data elements. Therefore, in the example of arrangement 1600, orchestration system 1501 may, for example, split dataset 1601 between two or more inferencing engines using the same or different AI-models.

However, in other situations where the order of data elements is material to the inferencing process, such as when processing strings of data elements, orchestration system 1501 may need to consider strings, and/or sequences, of data elements. Namely, orchestration system 1501 may, for example, split dataset 1601 between two or more inferencing engines using the same or different AI-models according to respective strings, and/or sequences, of data elements.

To optimize the operation of inferencing complex 1503, for example to achieve a desired combination of time and cost requirements, orchestration system 1501 may use any one of the following arrangements or any combination thereof.

Orchestration system 1501 may use a first type of parallel arrangement, for example by splitting an input dataset such as dataset 1601 between into two or more datasets and feed each of these datasets into a respective inferencing engine, where all these inferencing engine may use the same AI-model. This arrangement may uncrease processing power, thus reducing processing time, however incurring a higher cost of processing.

Optionally and/or alternatively, orchestration system 1501 may use a second type of parallel arrangement, for example by feeding a dataset such as dataset 1601 into two or more inferencing engines using different AI-models. Such arrangement is shown and described with reference to FIG. 9. This arrangement may also reduce processing time, however incurring a higher cost of processing.

Obviously, orchestration system 1501 may combine the above arrangements. For example, by feeding a dataset such as dataset 1601 into two or more sets (pluralities) of inferencing engines. Each such set of inferencing engines may use a different AI-model, and each of the inferencing engines of the same set may use the same AI-engine. Orchestration system 1501 may then split the dataset of any of the sets into a plurality of sub-datasets and feed each sub-dataset into a different inferencing engine of the same set.

Optionally and/or alternatively, orchestration system 1501 may use a serial arrangement, for example by arranging two or more inferencing engines in series, where the inferencing engine downstream may process only the data (namely instances of the input dataset) that the upstream inferencing engine failed to recognize. Such arrangement is shown and described with reference to FIG. 10. This arrangement may reduce processing power, thus reducing the cost of processing, however increasing processing time.

Obviously, orchestration system 1501 may combine the above parallel and serial arrangements as necessary to achieve optimal operation of inferencing complex 1503 with respect to the combined requirements such as the time and cost requirements discussed above.

The term 'instances that the upstream inferencing engine failed to recognize', and/or 'instances not recognized', may refer to instances that the upstream inferencing engine has classified to one or more classes of 'unrecognized instances'. Alternatively, and/or additionally, the term 'instances that the upstream inferencing engine failed to recognize' may refer to instances that the upstream inferencing engine has recognized with recognition probability that is lower than a predetermined recognition threshold.

Additionally, orchestration system 1501 may use two or more AI-models that may recognize the same classes. For example, two AI-models may classify instances of an input dataset into the same set of classes. However, the two or more AI-models may differ by their respective requirement for processing power, and/or time period for processing the same input dataset, and or corresponding cost of execution, as well as accuracy of recognition, or classification, which may be translated into cost of insufficiency.

For example, the two or more AI-models may be of the type of artificial neural network (ANN) and have a different number of hidden layers. Therefore, the requirement for processing power, and/or time period for processing the same input dataset, and or corresponding cost of execution of an ANN having fewer layers may be lower, as well as the accuracy of recognition, or classification.

Additionally, orchestration system 1501 may use two or more AI-models that may recognize similar sets of classes. For example, a first AI-model may classify instances of an input dataset into a set of N classes, and a second AI-model may classify instances of an input dataset into a set of M classes, which may be a sub-set of the N classes of the first AI-model.

It is appreciated that the two AI-models may differ by their respective requirement for processing power, and/or time period for processing the same input dataset, and or corresponding cost of execution, as well as accuracy of recognition, or classification, which may be translated into cost of insufficiency.

It is appreciated that the two AI-models may differ by their respective requirement for processing power, and/or time period for processing the same input dataset, and or corresponding cost of execution, as well as accuracy of recognition, or classification, which may be translated into cost of insufficiency.

It is appreciated that for a requirement to process an input dataset in a short time, and/or reduced cost, orchestration system 1501 may determine that it is optimal to use an AI-model that may recognize fewer classes of instances, and hence may be faster and/or less costly. However, the particular few classes of instances may have a relatively larger effect of the resulting sufficiency.

In the example of FIG. 16, and/or arrangement 1600, orchestration system 1501 has determined that the time constraint and the processing load required for operating two inference engines in parallel, in order to process dataset 1601 in time. Therefore, inference engines 1603, and 1604 may use the same AI-model 1605.

Inference engines 1603 and 1604 may correspond to action 527 of FIG. 5. Hence, AI-model 1605 may be equivalent, for example, to AI-model 510A of FIG. 10. For example, AI-model 1605 may be trained with dataset 800F of FIG. 8.

In such case, that two or more inference engines such as inference engines 1603, and 1604 may use the same AI-model 1605, orchestration system 1501 may split dataset 1601 between the two or more inference engines such as inference engines 1603 and 1604. Such split operation may be performed, for example, by orchestration system 1501 feeding instances of dataset 1601 alternatively between inference engines 1603, and 1604.

It is appreciated that orchestration system 1501 may add a third or more inference engine such as inference engines 1603 and 1604 using the same AI-model 1605, and split dataset 1601 alternatively between the three (or more) inference engines, to further reduce the time of processing dataset 1601 by AI-model 1605. This is an example of the continuous, or repetitive, aspect of orchestration system 1501, and/or AI system 1500, and/or the process of optimizing the operation of supervised system 1502 within requirements such time and cost requirements.In the example of FIG. 16, and/or arrangement 1600, each inference engine such as inference engines 1603 and 1604, may have two output data-streams (datasets). A dataset 1606 may carry data instances recognized by AI-model 1605, and a dataset 1607 may carry data instances not recognized by AI-model 1605.

As shown in FIG. 16, and/or arrangement 1600, orchestration system 1501 may have determined that output datasets 1606 of both inference engines 1603 and 1604, may be merged via connector "B" into the input of inference engine 1608.

For example, orchestration system 1501 may determine that inference engine 1608 may correspond to action 530 of FIG. 5. Hence, orchestration system 1501 may determine that inference engine 1608 may use an AI-model 1609, which may be equivalent, for example, to AI-model 519A of FIG. 10. For example, AI-model 1605 may be trained with dataset 800F of FIG. 8.

It is appreciated that orchestration system 1501 may have determined that a single instance of inference engine 1608 is sufficient to process both output datasets 1606 of inference engines 1603 and 1604 within the time constraint of input 1506. For example, the processing load of AI-model 1609 may be half the processing load of AI-model 1605.

As shown in FIG. 16, and/or arrangement 1600, orchestration system 1501 may determine that output dataset 1610 of inference engine 1608, including instances recognized by inference engine 1608, may be provided via connector "D" directly to output module 1611 to be included in output dataset 1612. Output dataset 1612 may correspond to dataset 1510 of FIG. 15.

As shown in FIG. 16, and/or arrangement 1600, orchestration system 1501 may determine that output dataset 1613 of inference engine 1608, including instances not recognized by inference engine 1608, may be provided via connector "C" to the input of inference engine 1614.

It is appreciated that in the example of arrangement 1600, the data passing through connector "C" may incude instances of output data 1607 and 1613, which is not recognized by inference engines 1603, 1604, and 1608.

Orchestration system 1501 may determine inference engine 1614 to be a second stage of processing dataset 1601, by processing an AI-model 1615 corresponding, for example, to AI-model 510B of FIG. 10.

As shown in FIG. 16, and/or arrangement 1600, orchestration system 1501 may determine that output dataset 1616 of inference engine 1614, including instances recognized by inference engine 1614, may be provided via connector "E" to the input of inference engines 1617 and 1618. Inference engines 1617 and 1618 may be equivalent, for example, to action 530 of FIG. 10 processing AI-model 519B.

In one example, of arrangement 1600, inference engines 1617 and 1618 may process in parallel the same AI-model 1619, for example, to provide more processing power, to process dataset 1601, and particularly the data provided via connector "E", within the required time restriction as set, for example, by input 1506. Therefore, the data provided via connector "E" may be split between of inference engines 1617 and 1618.

In another example, of arrangement 1600, inference engines 1617 and 1618 may process in parallel two (or more) different AI-models 1619, for example, to provide more processing power, and/or to process dataset 1601 within the required time restriction as set, for example, by input 1506. For example, AI-model 519B of FIG. 10 may be split into two AI-models 1619 to enable efficient parallel processing. In this example, the two different AI-models 1619 may classify the data provided via connector "E" into two (or more) different classification sets. Therefore, the data provided via connector "E" may be fed to both inference engines 1617 and 1618.

For example, AI-model 1619 used by inference engine 1617 may recognize instances of classes of the mainstream part of dataset 1601, while AI-model 1619 used by inference engine 1618 may recognize instances of classes of the tail part of dataset 1601.

For example, if cost requirement and/or time requirement require reducing some processing, orchestration system 1501 may determine not to use AI-model 1619, because, for example, the low quantity, or the low quality (such as low accuracy) of the recognized data derived from the tail part. In this sense, orchestration system 1501 may operate training complex 1504 to create AI-models for two or more classification sets of classification 533 and/or classification 534 to enable orchestration system 1501 to optimize the processing of AI system 1500 according to time and/or cost requirements, and/or any similar requirements.

It is appreciated that orchestration system 1501 may have a database of AI-models, where some of the AI-models are overlapping in the sense that two or more AI-models may recognize the same one or more types (classes) of instances. These overlapping AI-models enable orchestration system 1501 to devise an arrangement of inference engines, such as arrangement 1600, that is less costly, for example, by using less processing power, and/or is faster, for example, by using operating inference engines in parallel. Such database of AI-models is provided to orchestration system 1501 as AI-models 1414 of FIG. 14.

As shown in FIG. 16, and/or arrangement 1600, orchestration system 1501 may determine that output datasets 1610 of inference engines 1617 and 1618, carrying recognized instances, may be communicated via connector "D" to directly to output module 1611 to be included in output dataset 1612.

As shown in FIG. 16, and/or arrangement 1600, orchestration system 1501 may determine that output dataset 1620 of inference engine 1618, including instances not recognized by inference engine 1618, may be provided via connector "F" to inference engine 1621, as well as, for example, output dataset 1622 including instances not recognized by inference engine 1614.

Orchestration system 1501 may determine inference engine 1621 to be a third stage of processing dataset 1601, by processing an AI-model 1623 corresponding, for example, to AI-model 510C of FIG. 10.

As shown in FIG. 16, and/or arrangement 1600, orchestration system 1501 may determine that output dataset 1624 of inference engines 1617, including instances not recognized by inference engine 1617, may be provided via connector "G" directly to inference engine 1625. Inference engine 1625 may use AI-model 1626 corresponding, for example, to AI-model 519C of FIG. 10.

It is appreciated that the non-recognized output 1624 of the inference engine 1617 using AI-model 1619 may be directed to the input of the inference engine 1625 using AI-model 1626, for example, because both have the same classification structure 534 of FIG. 5. In other words, Orchestration system 1501 may determine that instances not recognized by an AI-model of a particular generation (e.g., 519B) may be recognized by an AI-model of a different generation (e.g., 510C).

Connector "G" may also collect other output datasets of other inference engines, for example, dataset 1627 of inference engine 1621.

Orchestration system 1501 may then determine that output dataset 1610 of inference engine 1625, including instances recognized by either inference engine 1625, may be provided via connector "D" directly to output module 1611 to be included in output dataset 1612. Output module 1611 may collect all the recognized instances of the final inference engines (e.g., inference engines executing AI-models 519A, 519B, and 519C) typically routed via connectors designated by "D". Output module 1611 may also function as comparator action 902 of FIG. 9.

Orchestration system 1501 may collect all the remaining and/or unrecognized instances, such as designated by "H", into a collection, and/or dataset 1628. Orchestration system 1501 may then evaluate the benefit of further processing dataset 1628. The benefit of processing dataset 1628 may be calculated based on the cost of sufficiency, or insufficiency, of classes not yet recognized by the AI-models used so far by the current arrangement 1600 and/or inferencing complex 1503 the respective cost of processing of the associated AI-models, and the time remaining considering the time constraint. If such benefit exists, orchestration system 1501 may add the required AI-models to arrangement 1600 and/or inferencing complex 1503.

As described above, complex AI system 1500 may supervise the operation of inferencing complex 1503, and the operation of training complex 1504, as well as the operation of supervised system 1502, according to a set of requirements, such as provides by input datasets 1505.

Hence, orchestration system 1501 may have a set of requirements, such as a time budget and a cost budget. The time budget may reflect one or more time constraints or limitations. Such time constraints or limitations may limit the time of processing of AI system 1500 and/or supervised system 1502. Such time limitation may have an absolute value or a relative value such as a length of a time period. The cost budget may reflect the cost of processing by AI system 1500 and/or the cost of sufficiency, or insufficiency, of supervised system 1502, as well as other types of cost values, including, for example, revenues, including anticipated revenues.

The purpose of the supervising of inferencing complex 1503 is to provide supervised system 1502 with data such as output dataset 1612 of FIG. 16, or dataset 1510 of FIG. 15, that results in high sufficiency of supervised system 1502. For example, resulting in a relatively high reduction of the cost of operating a call-center. Such output dataset 1612 or 1510 should be processed and provided within the constraints of the set of requirements, such as time of processing and cost of processing.

Orchestration system 1501 may therefore select a particular set of AI-models, and arrange a plurality of inferencing engines using the selected AI-models, so that an output dataset (e.g., datasets 1612 or 1510) is processed and provided within the constraints of the set of requirements and results in the required sufficiency of the supervised system 1502.

In this respect, orchestration system 1501 may, for example, select an AI-model with a respective larger classification (more classes) to increase the number of instances (records) in the output dataset (e.g., datasets 1612 or 1510) provided to the supervised system 1502, to increase the sufficiency of the supervised system 1502, however increasing the time of processing and/or the cost of processing.

Alternatively, orchestration system 1501 may, for example, select an AI-model with a respective smaller classification (fewer classes) to reduce the time of processing and/or the cost of processing. However, decreasing the number of instances (records) in the output dataset (e.g., datasets 1612 or 1510) provided to the supervised system 1502, thus decreasing the sufficiency (or increasing the cost of insufficiency) of the supervised system 1502.

Alternatively, or additionally, orchestration system 1501 may, for example, arrange at least some of the AI engines processing the selected AI-models in parallel, to reduce the time of processing, however, increasing the cost of processing.

Alternatively, or additionally, orchestration system 1501 may, for example, arrange at least some of the AI engines processing the selected AI-models in series, to reduce the cost of processing, however, increasing the time of processing.

Therefore, by selecting the appropriate AI-models and arranging at least some of the respective inferencing engines is parallel and/or is series, orchestration system 1501 may optimize the operation of the AI system 1500 and/or supervised system 1502. In this respect, orchestration system 1501 may prepare in advance a plurality of AI-models, having various classification alternatives, such as the number of classes of a similar classification.

Orchestration system 1501 may have a first plurality of AI-models from which Orchestration system 1501 may select a second plurality of AI-models, and arrange a respective plurality of inference, each inference engine using one of the selected AI-models, such as arrangement 1600.

Orchestration system 1501 may therefore initiate a plurality of inference engines, assign an AI-model to each such initiated inference engine, and arrange the inference engines with their respective selected AI-models in series, or in parallel, or any combination of serial and parallel arrangement, as shown and described with reference to arrangement 1600.

Orchestration system 1501 may determine a particular number of inference engines, a particular selection of AI-models, and a particular arrangement of inference engines and their respective selected AI-models to process the required data, such as dataset 1601, within the time and cost budgets as described above.

For example, as detailed above with reference to arrangement 1600, orchestration system 1501 may determine how many generations of AI-models to use (e.g., AI-models 510A, 510B, and 510C as well as AI-models 519A, 519B, and 519C). Orchestration system 1501 may determine whether to use any of such AI-models in parallel or in series (e.g., system 900 and/or system 1000). Orchestration system 1501 may select for each such stage of the arrangement an AI-model that has more classes or fewer classes according to the time and cost budgets, including both the cost of processing and the cost of sufficiency or insufficiency.

Orchestration system 1501 may determine the routing of data between the various inference engines with their respective selected AI-models. Such routing may result in splitting and/or merging of data. For example, splitting data between inference engines processing the same selected AI-models. Such routing may result from the nature of the AI-models, such as AI-models 519A, 519B, 519C receiving data from respective AI-models 510A, 510B, 510C. Such routing may result from the nature of the data, or instances of data, being properly recognized, or being unrecognized, by a former inference engine, and/or AT-model.

Orchestration system 1501 may receive input datasets 1505 of FIG. 15, and/or dataset 1601 of FIG. 16, continuously, and/or repeatedly. Orchestration system 1501 may also receive continuously, and/or repeatedly input 1506 of FIG. 15, including supervisory parameters such as measures of sufficiency, or insufficiency, values of various time constraints, costing parameters, etc. Consequently, orchestration system 1501 may provide output dataset 1510 (or output dataset 1612) to supervised system 1502, continuously, and/or repeatedly. Consequently, orchestration system 1501 may optimize the operation of AI system 1500 and/or supervised system 1502 continuously and/or repeatedly.

Thus, orchestration system 1501 may determine in run-time, such as continuously and/or repeatedly, the selection of AI-models, and the arrangement of the inference engines executing the selected AI-models, as well as the routing of data between the inference engines. Such run-time arrangement (and/or rearrangement) may be associated with the remining time budget and/or cost budget. Such remining time budget and/or cost budget may be associated with input data such as input 1506 of FIG. 15. In this respect, Thus, orchestration system 1501 may change in run-time the selected AI-models, the arrangement of the inference engines executing the newly selected AI-models, as well as the routing of data between the newly arranged inference engines.

Orchestration system 1501 may optimize the operation of inferencing complex 1503, as well as the sufficiency of supervised system 1502, for example by selecting one or more particular AI-models 1514 from repository and/or database 1516. Such AI-models 1514 may be selected by orchestration system 1501 according to the cost of execution values and/or time of execution values stored in repository and/or database 1516 and associated with each AI-model 1514.

Orchestration system 1501 may therefore calculate for each such alternative AI-model 1514 the expected time to process a particular dataset, or number of instances, as well as the expected cost of processing the particular dataset, or number of instances, and also the expected cost of sufficiency, and/or insufficiency, resulting from the processing of the particular dataset, or number of instances.

Orchestration system 1501 may calculate the expected cost of processing a particular dataset by a particular AI-model according to the cost of executing the particular AI-model as stored in repository and/or database 1516, as well as the cost of training the particular AI-model as stored in repository and/or database 1516. The cost of training the particular AI-model may be depreciated, and/or divided, over a predetermined number of processing events of the particular AI-model.

Orchestration system 1501 may use the history of supervising the operation of supervised system 1502 to calculate the sufficiency or insufficiency values of a particular class of instances, and/or the sufficiency or insufficiency values of processing a particular number of instances of particular class of instances.

Therefore, orchestration system 1501 may anticipate the benefit, such as the cost of sufficiency or insufficiency of supervised system 1502, for a particular class, and/or set of classes, as represented, for example, in standard dataset 1515. Thus orchestration system 1501 may anticipate the benefit, such as the cost of sufficiency or insufficiency of supervised system 1502, for a particular Ai-model that may inference a particular dataset according to the particular class, and/or set of classes.

Orchestration system 1501 may then instruct training complex 1504 to train a new AI-model 1514 using any such selected set of classes, from example, derived from standard dataset 1515. Each such set of classes may then have its time of execution values, cost of processing values, cost of sufficiency or insufficiency values, etc.

Orchestration system 1501 may then select any number of such AI-models 1514, and arrange them for execution by respective inference engines within inferencing complex 1503, including appropriate data routing, so as to achieve an optimized operation of supervised system 1502, according to the time and cost requirements as described above.

It is therefore appreciated that complex AI system 1500, and/or orchestration system 1501, may supervise supervised system 1502 in the sense that complex AI system 1500 may receive data from supervised system 1502, such as datasets 1505, analyze the received data to form output data 1510, and communicate output data 1510 to supervise supervised system 1502. Supervised system 1502 may then use output data 1510 to improve its operation such as improve sufficiency, or reduce insufficiency, as discussed above, for example, by decreasing the number of calls to a call-center.

It is therefore appreciated that complex AI system 1500, and/or orchestration system 1501, may receive datasets 1505 repetitively, for example, as batches of data, for example for training purposes. For example, batch datasets such as dataset 505 and 516 of FIGS. 5, 9 and 10 datasets 600A, 600B, 600C, 600D, and 600E, or datasets 700A, 700B, 700C, 700D, and 700E, or 800A, 800B, 800C, 800D, 800E, and 800F of FIG. 6, etc. Such batch of data may include any of the data types such as customer data, billing data, call-center data, etc., or a combination thereof.

Such batch datasets may be used by orchestration system 1501 for training new AI-models 1514 by training complex 1504 and/or for updating standard dataset 1515. Such batch datasets may be used by orchestration system 1501 as input data-streams 15029 to be processed and/or analyzed in run-time. When input data-streams 15030 is a batch dataset orchestration system 1501 may create arrangement 1600 and the corresponding routing of data between the inference engines of arrangement 1600 according to the particular batch dataset, such as the number of instances in the batch datasets.

It is therefore appreciated that complex AI system 1500, and/or orchestration system 1501, may receive datasets 1505 continuously, for example, as a stream of records of any of the any of the data types such as customer data, billing data, call-center data, etc., or a combination thereof. Continuous data stream may be used for any of the above purposes and particularly as input data-streams 15031 to be processed and/or analyzed by training complex 1504. In such case, orchestration system 1501 may determine the routing for each record of the streaming input dataset independently, based on the current arrangement 1600 and the current constraints (such as time and cost limitations as discussed above).

It is further appreciated that complex AI system 1500, and/or orchestration system 1501, may determine the routing of input datasets 1505 of FIG. 15, or dataset 1601 of FIG. 16, on a record-by-record (instance by instance) basis. For example, orchestration system 1501 may assign a time and/or cost limitation (requirement) to each record (instance) of datasets 1505 or 1601.

For example, orchestration system 1501 may determine the expected benefit (e.g., sufficiency or insufficiency) associated with the particular record (for example, a customer), and accordingly limit the processing time or processing cost for the particular record (instance, customer). For example, orchestration system 1501 may determine to limit the number of processing stages of such record, or the number of inferencing engines, or AI-models, that may process such record before it is purged and/or routed out.

In one embodiment, complex AI system 1500 may divide a dataset between a plurality of inferencing engines using the same AI-models to shorten the time of processing and/or inferencing and/or classification of the dataset to fit within a predetermined time constraint and/or time requirement.

complex AI system 1500 may calculate the number of inferencing engines according to a predetermined time constraint.

In another embodiment, complex AI system 1500 may divide a first classification of a first AI-model between a plurality of second AI-models, so that the combined classification of the plurality of second AI-models is the first classification. Complex AI system 1500 may then feed an input dataset to a plurality of inferencing engines, each using an AI-model of the plurality of second AI-models to shorten the time of processing and/or inferencing and/or classification of the dataset to fit within a predetermined time constraint and/or requirement. Additionally and or alternatively, Complex AI system 1500 may initiate a plurality of inferencing engines, where each of the inferencing engines may use an AI-model of the plurality of second AI-models, so that instances of the dataset that are not properly recognized by a former inferencing engine are fed to the input of a later inferencing engine, to reduce cost of processing and/or inferencing and/or classification of the dataset to fit within a predetermined cost constraint and/or requirement.

In another embodiment, complex AI system 1500 may use an AI system to cluster a first dataset into a first classification including a first plurality of classes of instances of the first dataset. Complex AI system 1500 may then select a second classification including a second plurality of classes selected from the first classification. Complex AI system 1500 may then train a plurality of AI-models, where each AI-model is trained with a different second classification. Thereafter complex AI system 1500 may select an AI-model to recognize instances of a second dataset according to at least one of: the number of instances in the second dataset, a monetary value of the selected classes, a cost of processing of the selected classes, a time of processing of the selected classes, a predetermined time requirement, and a predetermined cost requirement.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a dataset, the method comprising:
using a first AI-model to cluster a first dataset into a first classification;
labeling instances of the first dataset according to the first classification to create a labeled dataset;
dividing the first classification into a plurality of sets of classes;
dividing the labeled dataset according to the plurality of sets of classes to form a plurality of labeled datasets, wherein each dataset of the plurality of labeled datasets includes only labeled instances of the respective class;
training each of a plurality of second AI-models with a different labeled dataset of the plurality of labeled datasets;
obtaining a second dataset;
selecting one AI-model from among the plurality of second AI-models to recognize instances of the second dataset;
calculating a number of inferencing engines to be used to inference the second dataset, wherein the number of inferencing engines is calculated as a function of:
a number of instances in the second dataset, or
a predetermined time requirement for recognizing the instances of the second dataset;
processing the second dataset using the selected AI-model to recognize the instances of the second dataset by:
deploying the selected AI-model to a group of inferencing engines comprised of the number of inferencing engines, including deploying an instance of the selected AI-model to each inferencing engine in the group of inferencing engines,
dividing the second dataset between the inferencing engines in the group of inferencing engines having the selected AI-model deployed thereto, such that each of the inferencing engines in the group of inferencing engines receives a respective portion of the second dataset, and
causing the group of inferencing engines to each use the select AI-model deployed thereto to process their received respective portion of the second dataset;
receiving from each inferencing engine in the group of inferencing engines a result of the processing of their received respective portion of the second dataset, wherein the result includes recognized instances included in the received respective portion of the second dataset and unrecognized instances included in the received respective portion of the second dataset;
merging the unrecognized instances included in the results from the group of inferencing engines to form a third dataset;
calculating a second number of inferencing engines to be used to inference the third dataset, wherein the second number of inferencing engines is calculated as a function of:
a number of instances in the third dataset, or
a predetermined time requirement for recognizing the instances of the third dataset;
deploying a third AI-model to a second group of inferencing engines comprised of the second number of inferencing engines, including deploying an instance of the third AI-model to each inferencing engine in the second group of inferencing engines;
dividing the third dataset between the inferencing engines in the second group of inferencing engines having the third AI-model deployed thereto, such that each of the inferencing engines in the second group of inferencing engines receives a respective portion of the third dataset;
for each of the inferencing engines in the second group of inferencing engines, causing the inferencing engine to process its portion of the third dataset using its respective instance of the third AI-model;
receiving from each inferencing engine in the second group of inferencing engines a result of the processing of their received respective portion of the third dataset, wherein the result includes recognized instances included in the received respective portion of the third dataset and unrecognized instances included in the received respective portion of the third dataset.

2. The method according to claim 1, wherein the method is performed by an orchestration system in communication with a plurality of inferencing engines.

3. The method according to claim 1, additionally comprising:
receiving as input the first dataset, the second dataset and at least one of:
the number of instances in the second dataset, or
the predetermined time requirement.

4. A non-transitory computer readable medium storing computer code executable by a processor to perform a method for processing a dataset comprising:
using a first AI-model to cluster a first dataset into a first classification;
labeling instances of the first dataset according to the first classification to create a labeled dataset;
dividing the first classification into a plurality of sets of classes;
dividing the labeled dataset according to the plurality of sets of classes to form a plurality of labeled datasets, wherein each dataset of the plurality of labeled datasets includes only labeled instances of the respective class;
training each of a plurality of second AI-models with a different labeled dataset of the plurality of labeled datasets;
obtaining a second dataset;
selecting one AI-model from among the plurality of second AI-models to recognize instances of the second dataset;
calculating a number of inferencing engines to be used to inference the second dataset, wherein the number of inferencing engines is calculated as a function of:
a number of instances in the second dataset, or
a predetermined time requirement for recognizing the instances of the second dataset;

processing the second dataset using the selected AI-model to recognize the instances of the second dataset by:
  deploying the selected AI-model to a group of inferencing engines comprised of the number of inferencing engines, including deploying an instance of the selected AI-model to each inferencing engine in the group of inferencing engines,
  dividing the second dataset between the inferencing engines in the group of inferencing engines having the selected AI-model deployed thereto, such that each of the inferencing engines in the group of inferencing engines receives a respective portion of the second dataset, and
  causing the group of inferencing engines to each use the select AI-model deployed thereto to process their received respective portion of the second dataset;
receiving from each inferencing engine in the group of inferencing engines a result of the processing of their received respective portion of the second dataset, wherein the result includes recognized instances included in the received respective portion of the second dataset and unrecognized instances included in the received respective portion of the second dataset;
merging the unrecognized instances included in the results from the group of inferencing engines to form a third dataset;
calculating a second number of inferencing engines to be used to inference the third dataset, wherein the second number of inferencing engines is calculated as a function of:
  a number of instances in the third dataset, or
  a predetermined time requirement for recognizing the instances of the third dataset;
deploying a third AI-model to a second group of inferencing engines comprised of the second number of inferencing engines, including deploying an instance of the third AI-model to each inferencing engine in the second group of inferencing engines;
dividing the third dataset between the inferencing engines in the second group of inferencing engines having the third AI-model deployed thereto, such that each of the inferencing engines in the second group of inferencing engines receives a respective portion of the third dataset;
for each of the inferencing engines in the second group of inferencing engines, causing the inferencing engine to process its portion of the third dataset using its respective instance of the third AI-model;
receiving from each inferencing engine in the second group of inferencing engines a result of the processing of their received respective portion of the third dataset, wherein the result includes recognized instances included in the received respective portion of the third dataset and unrecognized instances included in the received respective portion of the third dataset.

5. The non-transitory computer readable medium according to claim 4, wherein the method is performed by an orchestration system in communication with a plurality of inferencing engines having the AI-model and the plurality of second AI-models.

6. The non-transitory computer readable medium according to claim 4, additionally comprising:

receiving as input the first dataset, the second dataset and at least one of:
  the number of instances in the second dataset, or
  the predetermined time requirement.

7. A system, comprising:
a non-transitory memory storing instructions; and
one or more processors in communication with the non-transitory memory that execute the instructions to perform a method for processing a dataset comprising:
using a first AI-model to cluster a first dataset into a first classification;
labeling instances of the first dataset according to the first classification to create a labeled dataset;
dividing the first classification into a plurality of sets of classes;
dividing the labeled dataset according to the plurality of sets of classes to form a plurality of labeled datasets, wherein each dataset of the plurality of labeled datasets includes only labeled instances of the respective class;
training each of a plurality of second AI-models with a different labeled dataset of the plurality of labeled datasets;
obtaining a second dataset;
selecting one AI-model from among the plurality of second AI-models to recognize instances of the second dataset;
calculating a number of inferencing engines to be used to inference the second dataset, wherein the number of inferencing engines is calculated as a function of:
  a number of instances in the second dataset, or
  a predetermined time requirement for recognizing the instances of the second dataset;
processing the second dataset using the selected AI-model to recognize the instances of the second dataset by:
  deploying the selected AI-model to a group of inferencing engines comprised of the number of inferencing engines, including deploying an instance of the selected AI-model to each inferencing engine in the group of inferencing engines,
  dividing the second dataset between the inferencing engines in the group of inferencing engines having the selected AI-model deployed thereto, such that each of the inferencing engines in the group of inferencing engines receives a respective portion of the second dataset, and
  causing the group of inferencing engines to each use the select AI-model deployed thereto to process their received respective portion of the second dataset;
receiving from each inferencing engine in the group of inferencing engines a result of the processing of their received respective portion of the second dataset, wherein the result includes recognized instances included in the received respective portion of the second dataset and unrecognized instances included in the received respective portion of the second dataset;
merging the unrecognized instances included in the results from the group of inferencing engines to form a third dataset;
calculating a second number of inferencing engines to be used to inference the third dataset, wherein the second number of inferencing engines is calculated as a function of:
  a number of instances in the third dataset, or
  a predetermined time requirement for recognizing the instances of the third dataset;
deploying a third AI-model to a second group of inferencing engines comprised of the second number of inferencing engines, including deploying an instance of the third AI-model to each inferencing engine in the second group of inferencing engines;

dividing the third dataset between the inferencing engines in the second group of inferencing engines having the third AI-model deployed thereto, such that each of the inferencing engines in the second group of inferencing engines receives a respective portion of the third dataset;

for each of the inferencing engines in the second group of inferencing engines, causing the inferencing engine to process its portion of the third dataset using its respective instance of the third AI-model;

receiving from each inferencing engine in the second group of inferencing engines a result of the processing of their received respective portion of the third dataset, wherein the result includes recognized instances included in the received respective portion of the third dataset and unrecognized instances included in the received respective portion of the third dataset.

8. The system according to claim 7, wherein the method is performed by an orchestration system in communication with a plurality of inferencing engines.

9. The system according to claim 7, additionally comprising:

receiving as input the first dataset, the second dataset and at least one of:
the number of instances in the second dataset, or
the predetermined time requirement.

* * * * *